(12) United States Patent
Huang et al.

(10) Patent No.: US 11,844,055 B2
(45) Date of Patent: Dec. 12, 2023

(54) POWER CONTROL FOR BEACON AND ECHO PROCEDURE FOR CHANNEL STATE INFORMATION MEASUREMENT IN SIDELINK NETWORKS

(71) Applicant: QUALCOMM Incorporated, San Diego, CA (US)

(72) Inventors: Yi Huang, San Diego, CA (US); Peter Gaal, San Diego, CA (US); Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 17/483,389

(22) Filed: Sep. 23, 2021

(65) Prior Publication Data

US 2022/0110129 A1    Apr. 7, 2022

Related U.S. Application Data

(60) Provisional application No. 63/086,571, filed on Oct. 1, 2020.

(51) Int. Cl.
| | |
|---|---|
| *H04L 1/00* | (2006.01) |
| *H04L 5/00* | (2006.01) |
| *H04W 72/02* | (2009.01) |
| *H04W 72/044* | (2023.01) |
| *H04W 72/563* | (2023.01) |

(52) U.S. Cl.
CPC ....... *H04W 72/0473* (2013.01); *H04L 1/0003* (2013.01); *H04L 5/0051* (2013.01); *H04W 72/02* (2013.01); *H04W 72/563* (2023.01)

(58) Field of Classification Search
CPC .......... H04W 72/0473; H04W 72/563; H04W 72/02; H04L 1/0003; H04L 5/0051
USPC ......................................................... 370/329
See application file for complete search history.

(56) References Cited

U.S. PATENT DOCUMENTS

| | | | | |
|---|---|---|---|---|
| 2014/0334392 | A1* | 11/2014 | Gage | ...................... H04L 5/0092 370/329 |
| 2014/0370904 | A1* | 12/2014 | Smith | ................... H04W 76/11 455/450 |
| 2017/0215154 | A1* | 7/2017 | Kim | ...................... H04B 17/318 |
| 2019/0166563 | A1* | 5/2019 | Ansari | ................. H04B 7/0617 |
| 2020/0296614 | A1* | 9/2020 | Lee | ................... H04W 28/0289 |
| 2021/0345374 | A1* | 11/2021 | Abotabl | .................... H04L 5/14 |
| 2021/0410084 | A1* | 12/2021 | Li | ....................... H04W 52/265 |

* cited by examiner

*Primary Examiner* — Kwang B Yao
*Assistant Examiner* — Xuan Lu
(74) *Attorney, Agent, or Firm* — Procopio, Cory, Hargreaves & Savitch LLP

(57) ABSTRACT

Aspects presented herein may improve the efficiency and/or the performance of a beacon-echo procedure between sidelink UEs. In one aspect, an apparatus receives, from a base station, at least one of a beacon power level or an echo power level for a beacon-echo procedure. The apparatus transmits, to a second UE, a beacon RS based on the beacon power level. The apparatus receives, from the second UE, an echo RS based on the beacon RS. The apparatus transmits a PSSCH using one or more parameters determined based at least in part on the echo RS.

30 Claims, 15 Drawing Sheets

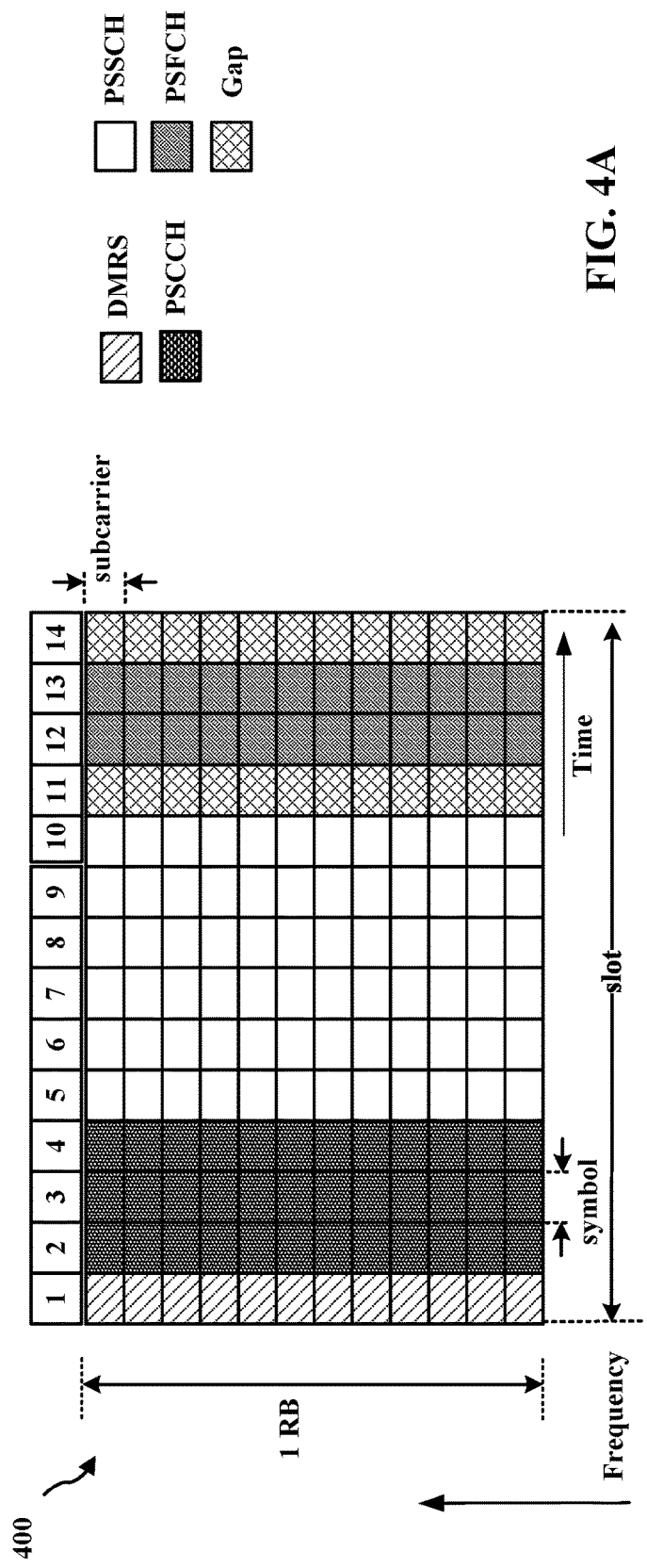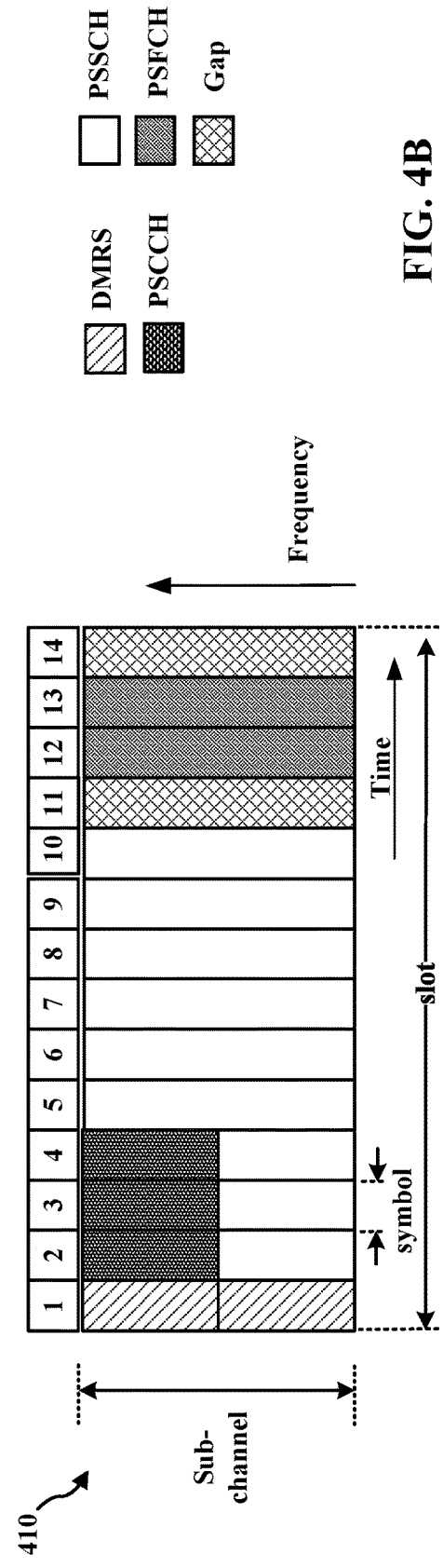
FIG. 4A
FIG. 4B

POWER CONTROL FOR BEACON AND ECHO PROCEDURE FOR CHANNEL STATE INFORMATION MEASUREMENT IN SIDELINK NETWORKS

CROSS REFERENCE TO RELATED APPLICATION(S)

This application claims the benefit of priority of Provisional Application Ser. No. 63/086,571, entitled "POWER CONTROL FOR BEACON AND ECHO PROCEDURE FOR CHANNEL STATE INFORMATION MEASUREMENT IN SIDELINK NETWORKS" and filed on Oct. 1, 2020, which is expressly incorporated by reference herein in its entirety.

TECHNICAL FIELD

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user equipment (UE) (e.g., a sidelink transmitting UE). The apparatus may receive, from a base station, at least one of a beacon power level or an echo power level for a beacon-echo procedure. The apparatus may also transmit, to a second UE, a beacon reference signal (RS) based on the beacon power level. The apparatus may also receive, from the second UE, an echo RS based on the beacon RS. The apparatus may transmit a physical sidelink shared channel (PSSCH) using one or more parameters determined based at least in part on the echo RS.

In an aspect of the disclosure, a method, a computer-readable medium, and an apparatus are provided for wireless communication at a second UE (e.g., a sidelink receiving UE). The apparatus may receive, from a base station, a beacon power level a beacon-echo procedure. The apparatus may also receive, from a first UE, a beacon RS based on the beacon power level. The apparatus may also calculate a transmission (Tx) power for transmitting an echo RS based on at least one of a path loss or a target reception (Rx) power level. The apparatus may also transmit, to the first UE, the echo RS based on the calculated transmission power.

In an aspect of the disclosure, a method, a computer-readable medium, and an apparatus are provided for wireless communication at a second UE (e.g., a sidelink receiving UE). The apparatus may receive, from a base station, at least one of a beacon power level or an echo power level for a beacon-echo procedure. The apparatus may also receive, from a first UE, a beacon RS based on the beacon power level. The apparatus may also transmit, to the first UE, an echo RS based on the echo power level.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A and 4B illustrates example aspects of a sidelink slot structure in accordance with various aspects of the present disclosure.

DETAILED DESCRIPTION

Figure 1:
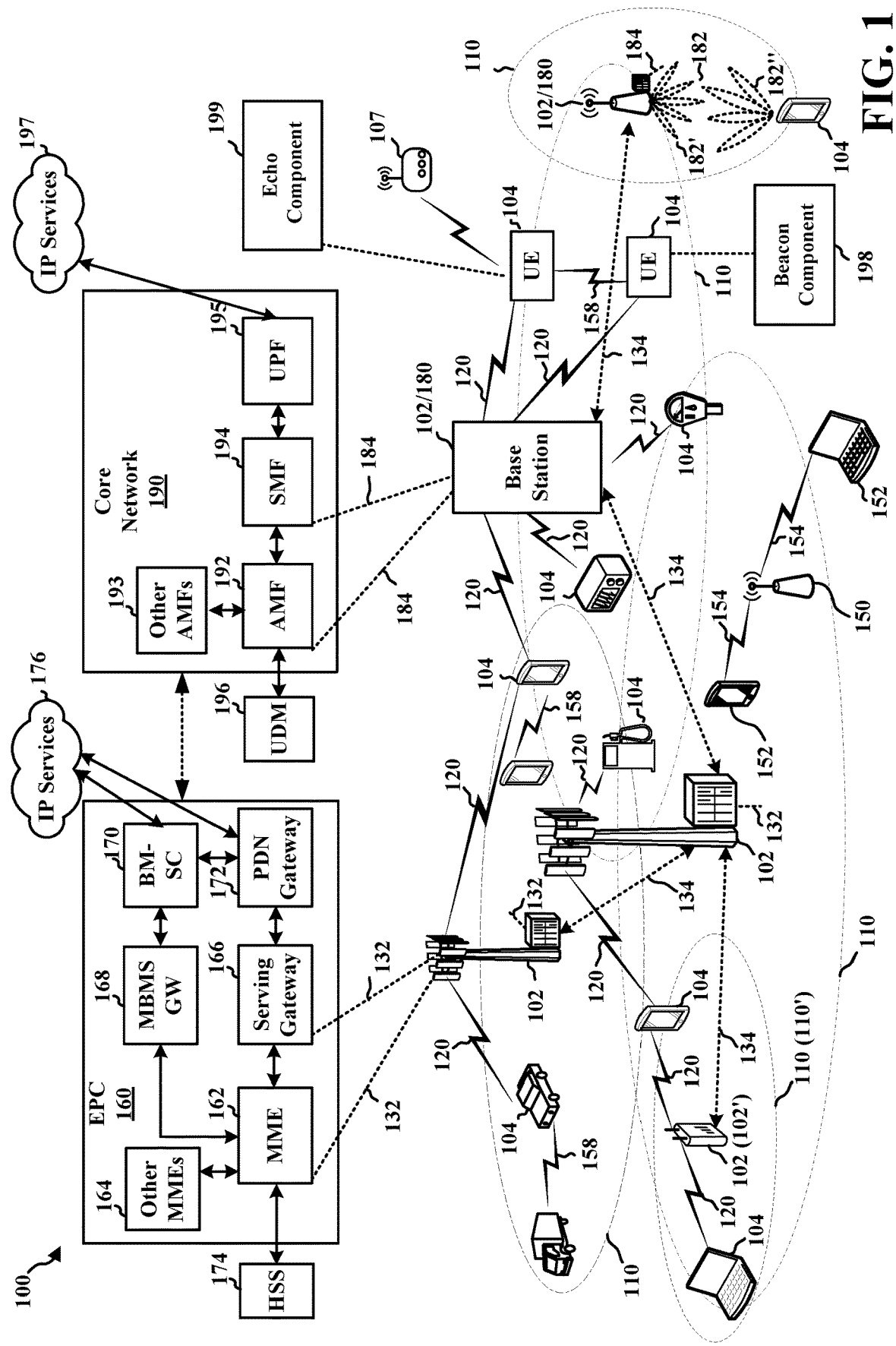
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a transmitting UE (e.g., a first UE, a source UE, UE 104) may be configured to include a beacon component 198. In certain aspects, a receiving UE (e.g., a receiving UE, a destination UE, another UE 104) may be configured to include an echo component 199. In one aspect, the beacon component 198 may be configured to receive, from a base station, at least one of a beacon power level or an echo power level for a beacon-echo procedure. The beacon component 198 may be configured to transmit, to a second UE, a beacon RS based on the beacon power level. The beacon component 198 may be configured to receive, from the second UE, an echo RS based on the beacon RS. The beacon component 198 may be configured to transmit a PSSCH using one or more parameters determined based at least in part on the echo RS.

In one aspect, the echo component 199 may be configured to receive, from a base station, at least one of a beacon power level or an echo power level for a beacon-echo procedure. The echo component 199 may be configured to receive, from a first UE, a beacon RS based on the beacon power level. The echo component 199 may be configured to calculate a transmission power for transmitting an echo RS based on at least one of a path loss or a target reception power level. The echo component 199 may be configured to transmit, to the first UE, the echo RS based on the calculated transmission power.

In another aspect, the echo component 199 may be configured to receive, from a base station, at least one of a beacon power level or an echo power level for a beacon-echo procedure. The echo component 199 may be configured to receive, from a first UE, a beacon RS based on the beacon power level. The echo component 199 may be configured to transmit, to the first UE, an echo RS based on the echo power level.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
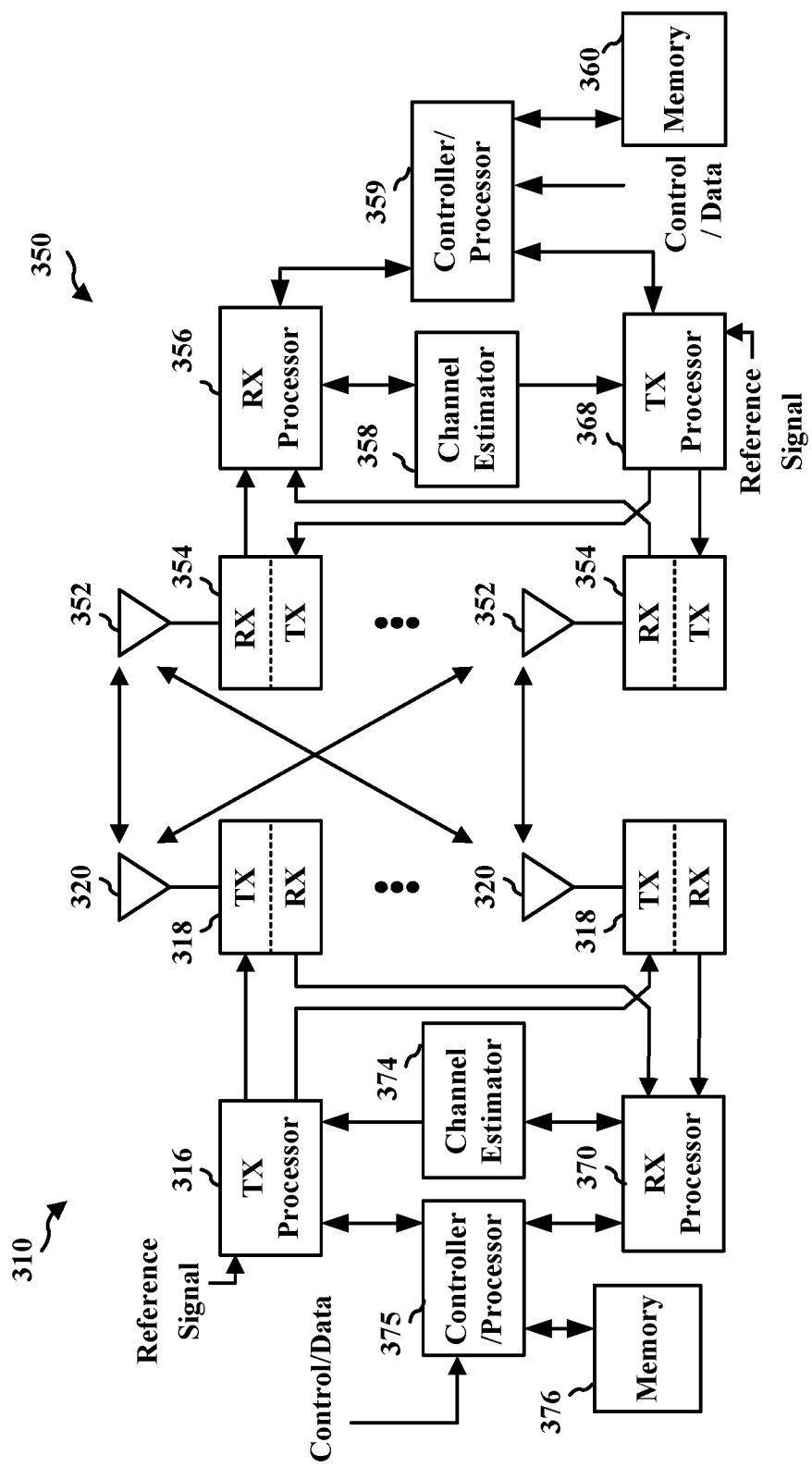
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 2:
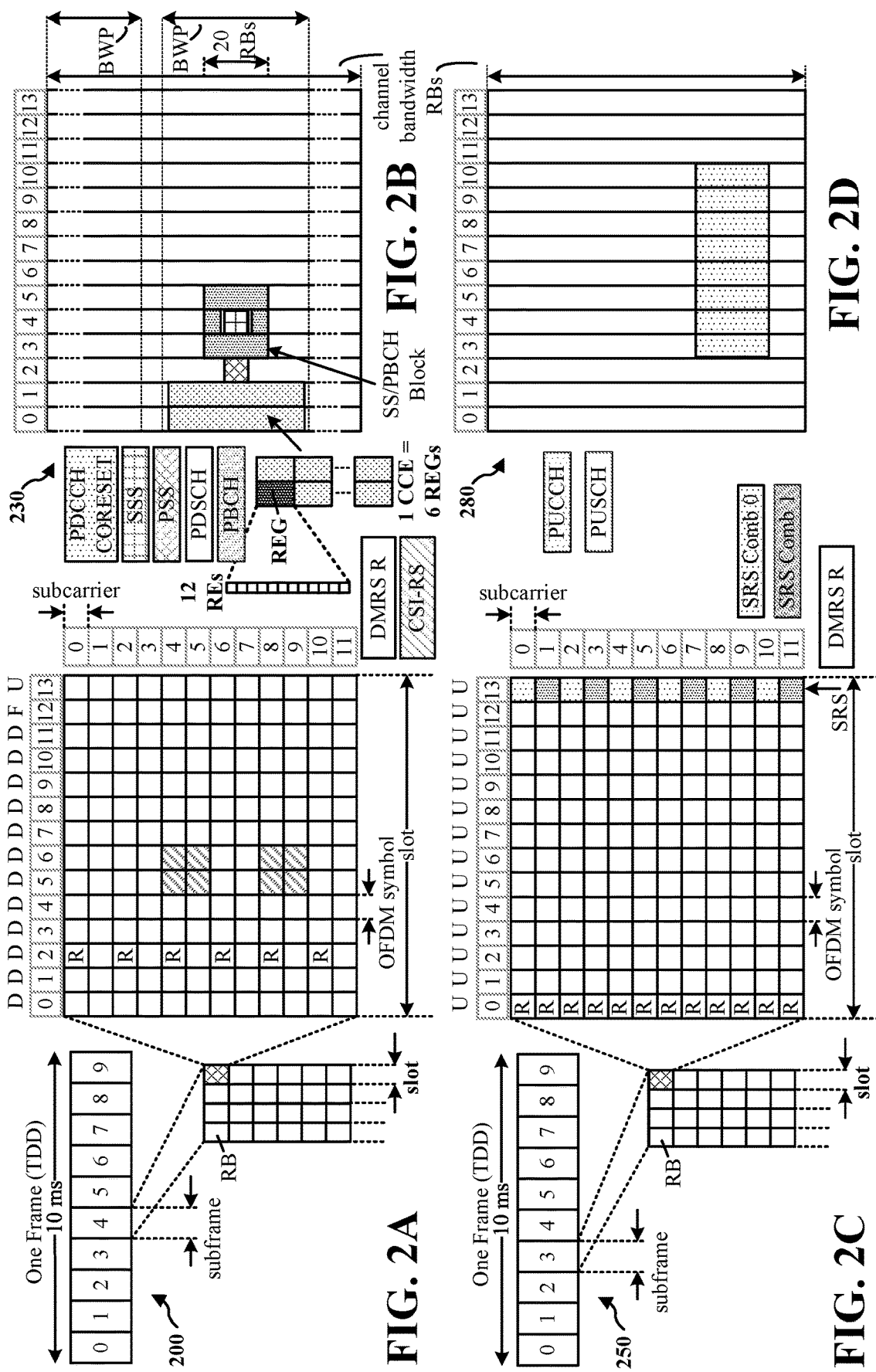
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIGS. 4A and 4B include diagrams 400 and 410 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 2B illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIGS. 2A and 2B, some of the REs may comprise control information in PSCCH and some REs may comprise demodulation RS (DMRS). At least one symbol may be used for feedback. FIGS. 2A and 2B illustrate examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIGS. 2A and 2B. Multiple slots may be aggregated together in some examples.

At least one of the TX processor 368, the RX processor 356, the controller/processor 359, the TX processor 316, the RX processor 370, or the controller/processor 375 may be configured to perform aspects in connection with the beacon component 198 and/or the echo component 199 of FIG. 1. For example, the beacon component 198 may be configured to transmit beacon RS with a fixed power and/or monitor for echo RS at specified resources pool. The echo component 199 may be configured to transmit echo RS with a fixed power. Alternatively, the echo component 199 may be configured to measure the power level of the received beacon RS and determine an echo RS transmission power based on the measurement and a target receive power, and transmit the echo RS based on the determined echo RS transmission power.

Figure 5:
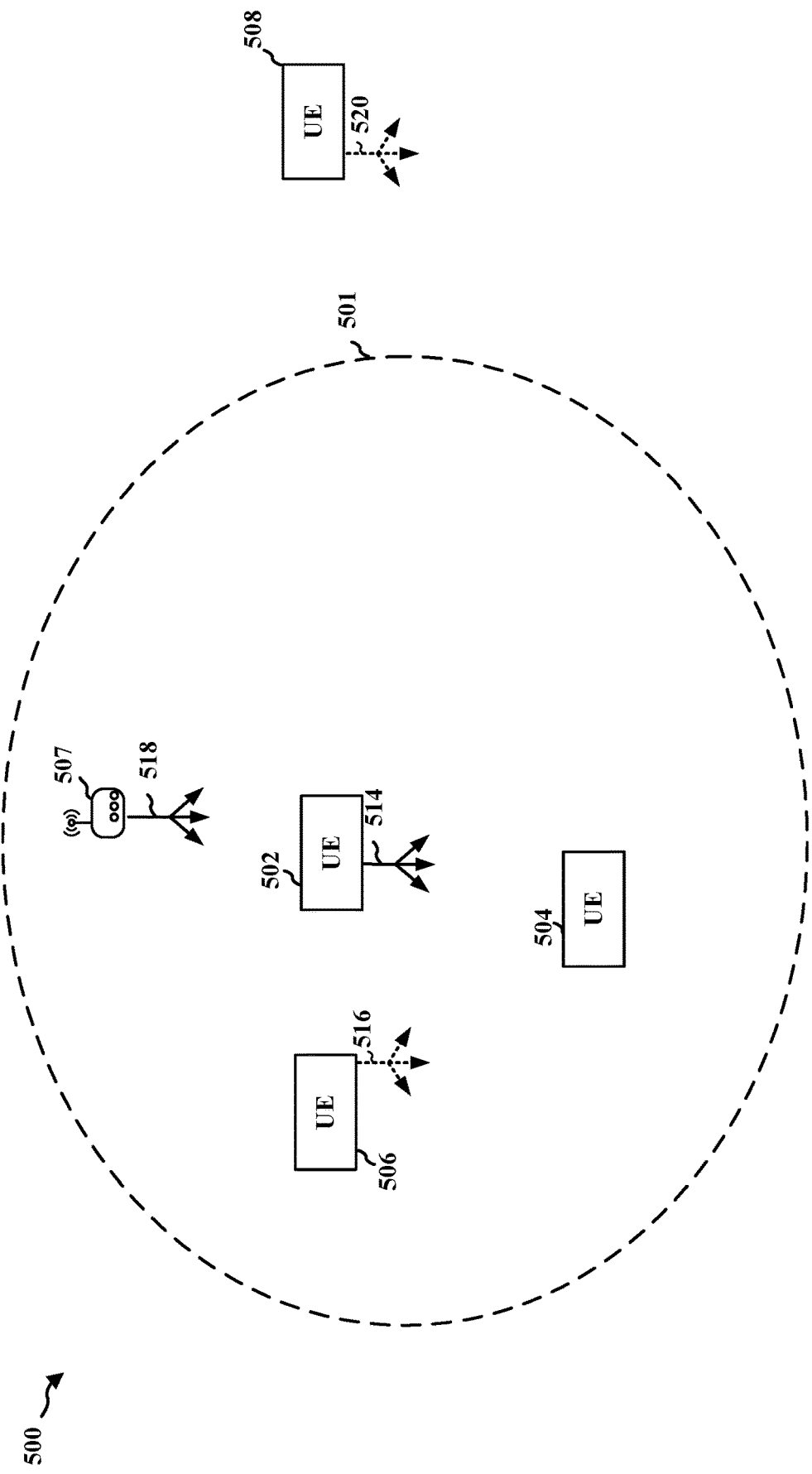
FIG. 5 illustrates an example sidelink communication system in accordance with various aspects of the present disclosure.

FIG. 5 illustrates an example 500 of wireless communication between devices based on sidelink communication. The communication may be based on a slot structure including aspects described in connection with FIGS. 2A and 2B. For example, transmitting UE 502 may transmit a transmission 514, e.g., including a control channel and/or a corresponding data channel, that may be received by receiving UEs 504, 506, 508. A control channel may include information for decoding a data channel and may also be used by a receiving device to avoid interference by refraining from transmitting on the occupied resources during a data transmission. The number of TTIs, as well as the RBs that will be occupied by the data transmission, may be indicated in a control message from the transmitting device. The UEs 502, 504, 506, 508 may each be capable of operating as a transmitting device in addition to operating as a receiving device. Thus, UEs 506, 508 are illustrated as transmitting transmissions 516, 520. The transmissions 514, 516, 520 may be broadcast or multicast to nearby devices. For example, UE 514 may transmit communication intended for receipt by other UEs within a range 501 of UE 514. Additionally, or alternatively, the RSU 507 may receive communication from and/or transmit communication 518 to UEs 502, 504, 506, 508.

Sidelink communication that is exchanged directly between sidelink UEs may include discovery messages for sidelink UEs to find nearby UEs and/or may include sensing of resource reservations by other sidelink UEs in order for sidelink UEs to select resources for transmission. Sidelink communication may be based on different types or modes of resource allocation mechanisms. In a first resource allocation mode (which may be referred to as "Mode 1," "sidelink transmission Mode 1," and/or "V2X Mode 1," etc.), a centralized resource allocation may be provided. For example, a base station 102 or 180 may determine resources for sidelink communication and may allocate resources to different UEs 104 to use for sidelink transmissions. In this first mode, a sidelink UE may receive the allocation of sidelink resources from the base station 102 or 180, such as via a resource radio control (RRC) message or a downlink control information (DCI) message (e.g., DCI 3_0).

In a second resource allocation mode (which may be referred to as "Mode 2," "sidelink transmission Mode 2," and/or "V2X Mode 2," etc.), a distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. For example, referring back to FIG. 4, the UE 502 may sense and select resources in a resource pool based on decoding SCI messages received (e.g., transmitted from the UE 504 and/or the UE 506, etc.) and performing reference signal receive power (RSRP) measurements of demodulation reference signal (DMRS) inside a corresponding PSSCH or a corresponding PSCCH. After the UE 502 senses and selects resources for transmission, the UE 502 may use SCI in a PSCCH (e.g., an SCI-1) and/or SCI in a PSSCH (e.g., an SCI-2) to schedule and transmit the data inside the PSSCH, such as via the transmission 514. The UE 502 may transmit the PSCCH and/or the PSSCH based on a unicast mode, a groupcast mode or a broadcast mode. These resource allocation mechanisms for sidelink may provide power savings, e.g., at a physical layer or a medium access control (MAC) layer. Power savings may be helpful in sidelink applications such as public safety applications, commercial applications, wearables, etc., which may include both periodic and aperiodic traffic.

A UE may perform sensing by monitoring for sidelink control information (SCI) indicating resources that the other UEs intend to use to transit sidelink transmissions. The SCI indicating resources may be described as reserving the sidelink resources. The indicated resources may be referred to as a sidelink reservation. The UE may monitor a set of frequency resources over a window of time. The frequency range may be based on a set of resources for sidelink communication. The time and frequency resources for sidelink communication may be referred to as a resource pool. The UE may determine the available resources in the resource pool based on the remaining resources that are not reserved. For example, in Mode 2 resource allocation, a UE that is interested in transmitting a packet may perform the sensing (i.e., monitor the activity in a communication resource pool), and the UE may determine if a resource in a future slot is reserved by another UE in a past slot. The UE may use a resource if the resource is not reserved by another UE to transmit a packet of higher priority or if the resource is reserved by another UE but the RSRP of the signal transmitted by the other UE is below a threshold. In another example, the UE may reserve resources if a measurement for the corresponding SCI that is received in the sensing window meets a threshold, such as an RSRP threshold or other signal strength threshold. In other words, a resource pool may be the collection of time/frequency resources on which sidelink communication may occur. The resource pool may be preconfigured (i.e., preloaded) on a UE or configured by the base station. After the occurrence of a resource selection trigger, the UE may select resources for transmission from the available resources in the resource pool. The resource selection may be triggered, by the UE having data for transmission.

A transmitting (Tx) UE (e.g., the UE 502, a source UE, etc.) may setup one or more transmission parameters such as a resource block (RB) allocation, a modulation and coding scheme (MCS), and/or a precoder for a sidelink transmission (e.g., 514). For example, the Tx UE may measure a channel condition (e.g., channel status, channel feedback, etc.) between the Tx UE and one or more receiving (Rx) UEs (e.g., the UEs 504, 506, 508, a destination UE, etc.) to determine the one or more transmission parameters.

Figure 6:
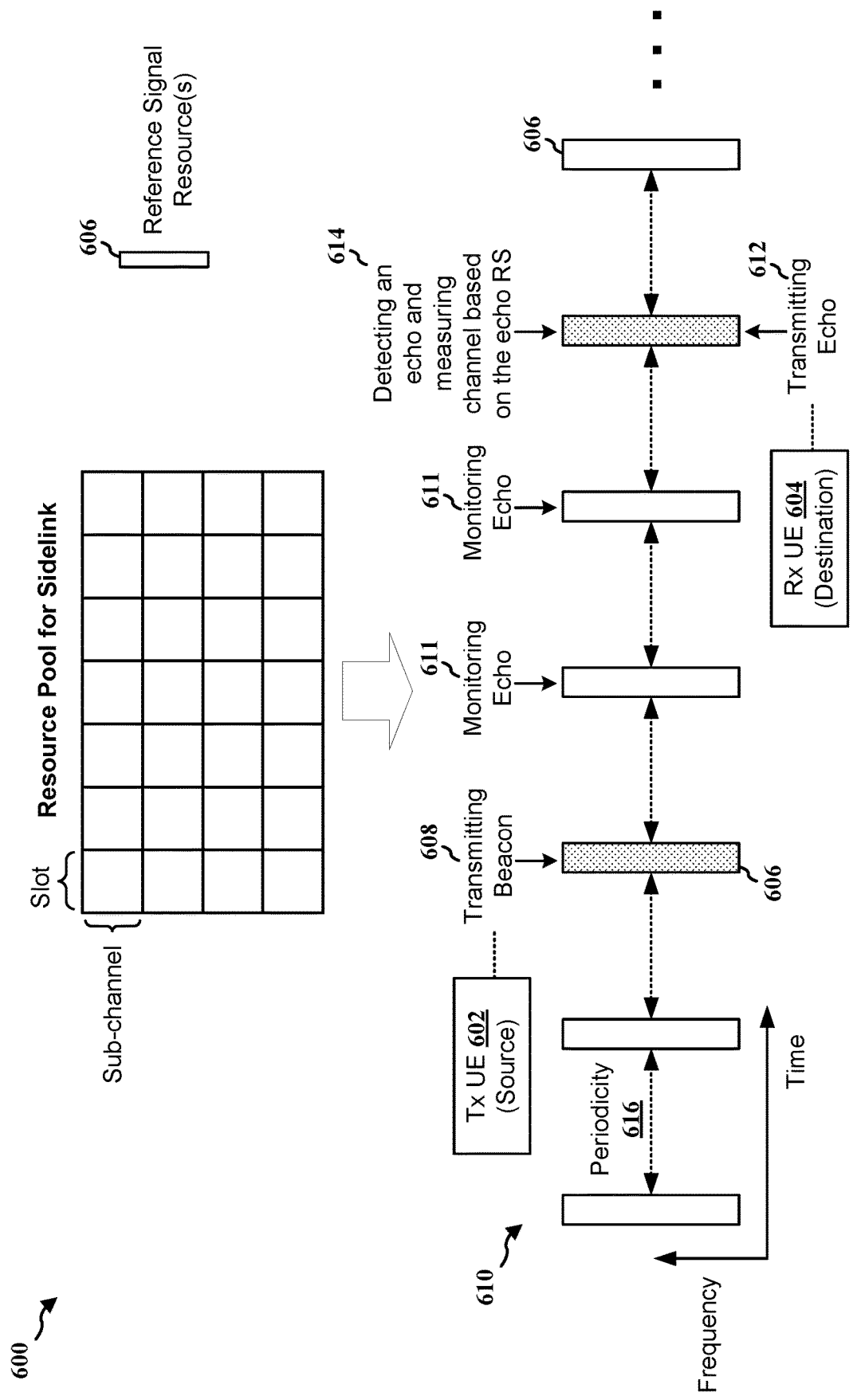
FIG. 6 is a diagram illustrating an example beacon-echo procedure in accordance with various aspects of the present disclosure.

FIG. 6 is a diagram 600 illustrating an example beacon-echo procedure which may be used for estimating/measuring channel conditions between sidelink UEs according to aspects of the present disclosure. A network (e.g., the base station 102 or 180) may setup a cell specific reference signal (RS) resource pool for one or more sidelink UEs (e.g., the UEs 502, 504, 506, 508), where the RS may be a wideband (WB) reference signal (WB-RS). The network may define multiple RS resources for RS transmission opportunities in time and frequency, such that the RS resources may be orthogonalized via time-division multiplexing (TDM) in time domain and/or via frequency-division multiplexing (FDM) in frequency domain. Then, a pair of sidelink Tx-Rx UEs may follow a beacon-echo procedure to transmit beacon RS, and measure the returned echo RS to get channel estimation (e.g., channel state information (CSI) feedback). As there may be a channel reciprocity between the sidelink Tx-Rx UEs, the Tx UE may determine one or more transmission parameters (e.g., MCS, RBs, precoder) based at least in part on the echo RS channel estimation.

For example, referring to FIG. 6, a Tx UE 602 (e.g., a source UE) and an Rx UE 604 (e.g., a destination UE) may use beacon and echo RS for sidelink channel estimation to obtain the CSI between the Tx UE 602 and the Rx UE 604, e.g., such as when the Tx UE 602 and/or the Rx UE 604 wake up from a discontinuous reception (DRX) state, perform a handover procedure, and/or transition from an RRC idle/inactive state to an RRC active state, etc. A network (e.g., the base station 102 or 180) may setup or define an RS resource pool 610 that includes multiple RS resources 606 for the Tx UE 602, the Rx UE 604, and other sidelink UEs over the sidelink to transmit a beacon RS and/or an echo RS. The network may also define a periodicity 616 between RS resources 606. The RS resources 606 may be associated with WB-RS. In one example, as shown at 608, the Tx UE 602 may transmit a beacon RS to the Rx UE 604 using one of RS resources 606. Then, at 611, the Tx UE 602 may monitor for a response (e.g., an echo) to the transmitted beacon RS. For example, the Tx UE 602 may monitor for the response at the defined periodicity 616. If the Rx UE 604 receives the beacon RS from the Tx UE 602, the Rx UE 604 may transmit an echo RS back to the Tx UE 602 as shown at 612. When the Tx UE 602 receives the echo RS, the Tx UE 602 may measure the returned echo RS to obtain a channel estimation between the Tx UE 602 and the Rx UE 604 as shown at 614. As there may be channel reciprocity between the Tx UE 602 and the Rx UE 604, the UE 602 may determine one or more transmission parameters for a physical sidelink shared channel (PSSCH) transmission based at least in part on the echo RS. For example, the Tx UE 602 may determine at least one of a precoder, a resource block (RB) allocation, a rank indicator (RI), or a modulation and coding scheme (MCS) for the PSSCH.

Figure 7:
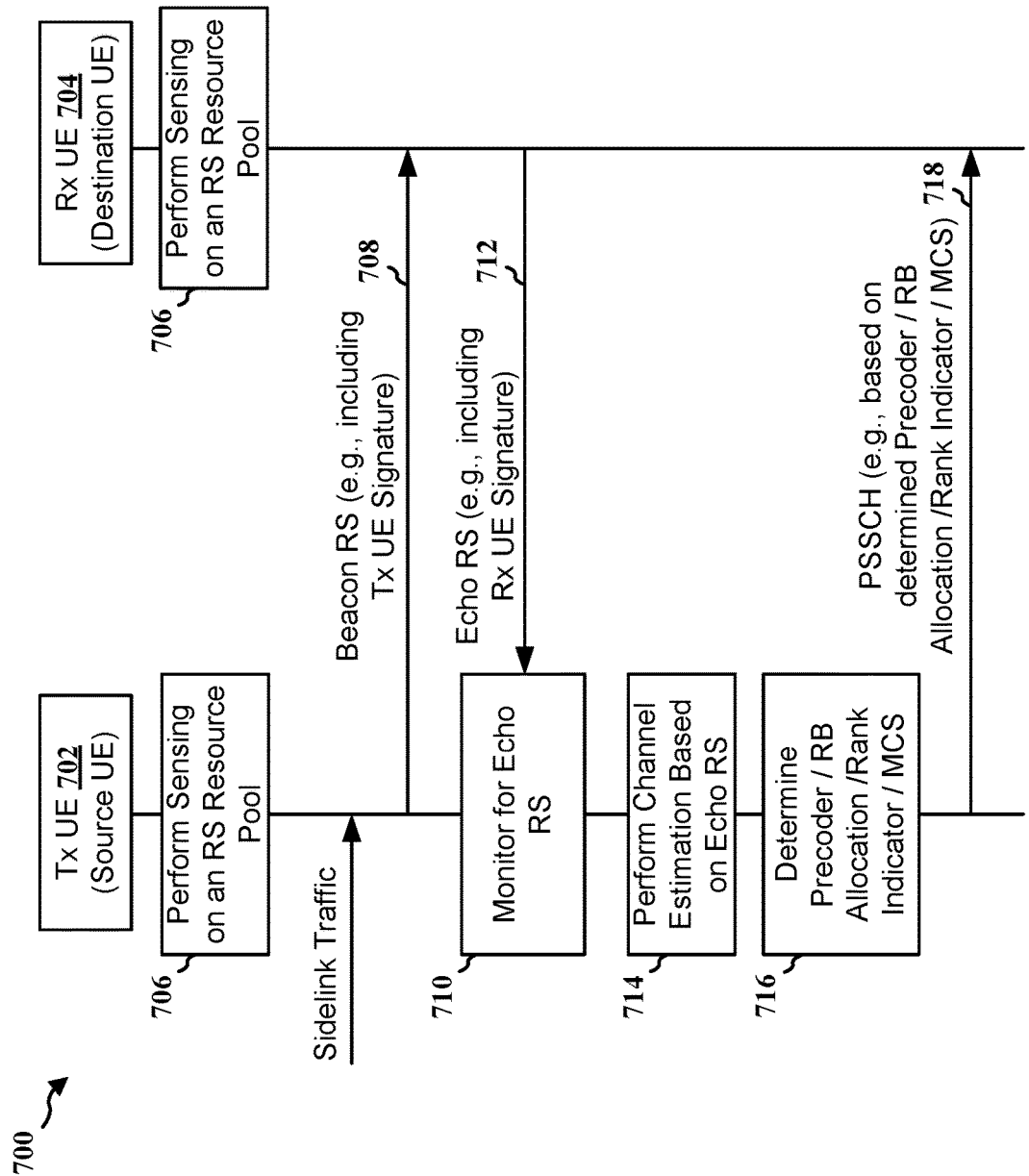
FIG. 7 is a communication flow illustrating a beacon-echo procedure according to aspects of the present disclosure.

FIG. 7 is a communication flow 700 between a Tx UE 702 (e.g., a first UE or a source UE) and an Rx UE 704 (e.g., a second UE or a destination UE) illustrating a beacon-echo procedure in accordance with various aspects of the present disclosure. When there is no traffic (e.g., data) to transmit or scheduled to transmit between the Tx UE 702 and the Rx UE 704, the Tx UE 702 and the Rx UE 704 may be referred to as silent UEs. As shown at 706, before or after a sidelink traffic (e.g., a transmission data) arrives, the silent Tx UE 702 and/or the silent Rx UE 704 may perform sensing on an RS resource pool. It may be up to the Tx UE 702 and/or the Rx UE 704's UE implementation whether to sense the RS resource pool continuously or from time to time (e.g., at a defined periodicity, schedule, or duration, etc.), and/or whether to sense a part/portion of the RS resource pool or the whole RS resource pool. At 708, if the Tx UE 702 has a traffic to transmit (e.g., after a sidelink traffic arrives), the Tx UE 702 may select (e.g., randomly and/or based on sensing) an available RS resource (e.g., the RS resource 606) and transmit a beacon RS using the selected RS resource to the Rx UE 704. The beacon RS may include the Tx UE 702's signature sequence, where the signature sequence may identify the Tx UE 702 and may be used for resource reservation, scheduling, and/or coordination among disparate systems operating on a shared spectrum, etc. The beacon RS from the Tx UE 702 may inform its neighbors (e.g., the Rx UE 704) that the Tx UE 702 is ready to transmit. After the Tx UE 702 sends the beacon RS, at 710, the Tx UE 702 may monitor for an echo for the transmitted beacon RS from neighboring UEs. For example, after the Tx UE 702 sends the beacon RS, the Tx UE 702 may measure the subsequent RS resources (e.g., at a defined periodicity, duration, etc.) until the Tx UE 702 detects an echo from a neighbor UE, which may be a designate node for the PSSCH transmission.

At 712, when the Rx UE 704 senses the beacon RS, the Rx UE 704 may return or respond with an echo RS using an available RS resource from the RS resource pool, which may be selected randomly and/or based on sensing by the Rx UE 704. Similarly, the echo RS may include the Rx UE 704's signature sequence that may be used for identifying the Rx UE 704.

At 714, if the Tx UE 702 detects the echo RS from the Rx UE 704 during the echo monitoring at 710, the Tx UE 702 may perform a channel estimation based on the echo RS to estimate (e.g., measure) the channel condition between the Tx UE 702 and the Rx UE 704. At 716, based at least in part on the channel estimation, the Tx UE 702 may determine one or more parameters for subsequent data (e.g., PSSCH) transmission(s) to the Rx UE 704. In other words, the Tx UE 702 may determine one or more parameters for a PSSCH transmission to the Rx UE 704, such as the precoder, RB allocation, rank indicator and/or MCS for transmitting the PSSCH, based at least in part on the echo RS from the Rx UE 704. At 718, the Tx UE 702 may transmit the PSCCH using the determined parameters.

Aspects presented herein may improve the efficiency and/or the performance of the beacon-echo procedure between sidelink UEs (e.g., Tx UE 602, 702 and Rx UE 604, 704). In one aspect of the present disclosure, a network (e.g., a base station 102 or 180) may configure a Tx UE and/or an Rx UE with a constant/fixed power level (e.g., in dB) for transmitting the beacon RS and/or for transmitting the echo RS, such as through RRC signaling. For example, the network may configure a common constant power level for transmitting the beacon RS (e.g., by the Tx UE) and for transmitting the echo RS (e.g., by the Tx UE), or the network may configure two separate constant power levels for transmitting the beacon RS and for transmitting the echo RS respectively.

In some scenarios, it may be suitable and efficient for a network to configure a constant power level to a Tx UE for transmitting the beacon RS instead of applying a power control mechanism. While a power control mechanism may enable a Tx UE to adjust the transmitting power of a transmission based on the channel condition, the Tx UE may not be aware of the channel condition when transmitting the beacon RS because there may be no path loss reference RS for the Tx UE to measure the channel condition and to set up an open loop power level for the power control mechanism. In other words, as the Tx UE may not have received any transmission from the Rx UE, the Tx UE may not be able to determine the channel condition between the Tx UE and the Rx UE for setting up path loss compensation factor(s) for the power control mechanism. Thus, the power control mechanism may not be applicable to the Tx UE for transmitting the beacon RS, and it may be more efficient to configure the Tx UE with a constant power level for transmitting the beacon RS.

It may also be beneficial for the network to configure a constant power level to an Rx UE for transmitting the echo RS. When the power for transmitting the echo RS is constant/fixed at the Rx UE and the Tx UE is aware of the constant power level, the Tx UE may be able to determine or set the MCS of a PSSCH transmission based on measuring the power level of a received echo RS. For example, in a sidelink communication, a network (e.g., a base station) may signal a range of MCS to a UE for the UE to follow, where the UE may determine an MCS within the range of MCS for a transmission. When the Tx UE measures the power level of a received RS and the measured power level is high (e.g., the power level is close to the constant power level or is above a threshold), it is likely that the distance between the Tx UE and the Rx UE is small (e.g., short) and/or that the channel condition between the Tx UE and the Rx UE is acceptable, good, or above a threshold. Thus, the Tx UE may determine to use a higher level MCS for the transmission. On the other hand, when the measured power level of a received echo RS is low (e.g., the power level is not close to the constant power level or is below a threshold), it is likely that the distance between the Tx UE and the Rx UE is large (e.g., far) and/or that the channel condition between the Tx UE and the Rx UE is unacceptable, poor, or below a threshold. Thus, the Tx UE may determine to use a lower level MCS for a transmission. For example, a mapping table (P_i↔MCS_i) may be defined between the measured received echo power (P_i) and corresponding MCS (MCS_i), where P_i may either be an absolute received echo power or a relative received echo power with respect to the configured echo Tx power.

Figure 8:
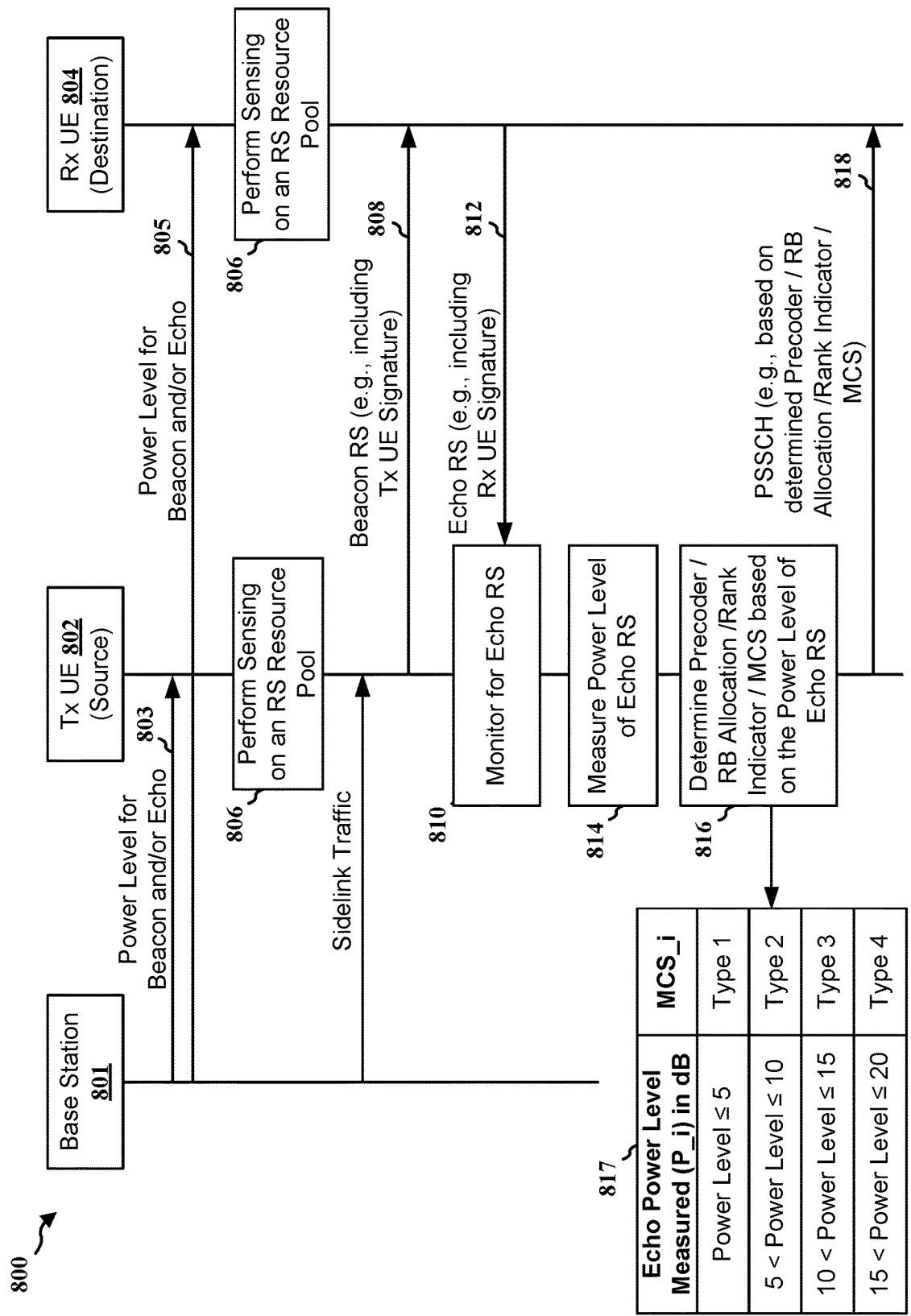
FIG. 8 is a communication flow illustrating a beacon-echo procedure according to aspects of the present disclosure.

FIG. 8 is a communication flow 800 between a Tx UE 802 (e.g., a first UE or a source UE), an Rx UE 804 (e.g., a second UE or a destination UE) and a base station 801 illustrating an example beacon-echo procedure with constant/fixed power control for beacon RS and/or echo RS in accordance with various aspects of the present disclosure. At 803, the base station 801 may indicate to the Tx UE 802 at least one of a beacon power level (e.g., the power for the Tx UE 802 to transmit the beacon RS) and/or an echo power level (e.g., the power for the Rx UE 804 to transmit the beacon RS) for a beacon-echo procedure. The base station 801 may indicate the beacon power level and/or the echo power level to the Tx UE 802 through RRC signaling. Similarly, at 805, the base station 801 may also indicate to the Rx UE 804 at least one of the beacon power level and/or the echo power level for the beacon-echo procedure, such as through RRC signaling. The beacon power level may be the same as the echo power level (e.g., both 20 dB), or they may be different (e.g., the beacon power level is 20 dB and the echo power level is 15 dB, etc.).

At 806, before or after a sidelink traffic (e.g., a transmission data) arrives, the Tx UE 802 and/or the Rx UE 804 may perform sensing on an RS resource pool, such as described in connection with FIG. 7. At 808, when the Tx UE 802 has a traffic to transmit (e.g., after the sidelink traffic arrives), the Tx UE 802 may select an available RS resource (e.g., the RS resource 606) and transmit a beacon RS to the Rx UE 804 using the selected RS resource. The beacon RS may include the Tx UE 802's signature sequence. The Tx UE 802 may also transmit the beacon RS based on the configured beacon power level. After the Tx UE 802 sends the beacon RS, at 810, the Tx UE 802 may monitor for an echo for the transmitted beacon RS from neighboring UEs. For example, after the Tx UE 802 sends the beacon RS, the Tx UE 802 may measure the subsequent RS resources until the Tx UE 802 detects an echo from a neighbor UE, which may be a designate node for the PSSCH transmission.

At 812, if the Rx UE 804 senses the beacon RS, the Rx UE 804 may return or respond with an echo RS using an available RS resource from the RS resource pool, which may be selected randomly and/or based on the sensing by the Rx UE 804. Similarly, the echo RS may include the Rx UE 804's signature sequence, and the Rx UE 804 may transmit the echo RS based on the configured echo power level (e.g., at a fixed power level configured by the base station 801).

At 814, when the Tx UE 802 detects the echo RS from the Rx UE 804 during the echo monitoring at 810, the Tx UE 802 may measure the power level of the received echo RS. At 816, based at least in part on the measured power level, the Tx UE 802 may determine one or more parameters for subsequent data transmission(s) to the Rx UE 804. For example, the Tx UE 802 may determine a precoder, an RB allocation, a rank indicator and/or an MCS for transmitting the PSSCH based at least in part on the echo RS transmitted from the Rx UE 804. In one example, the Tx UE 802 may determine the MCS based on a mapping 817 that defines the measured received echo power (e.g., P_i) and the corresponding MCS (MCS_i), where P_i may either be an absolute received echo power or a relative received echo power with respect to the configured echo Tx power, etc. For example, if the measured power level is 17 dB, the Tx UE 802 may use a Type 4 MCS (e.g., a higher level MCS). If the measured power level is 3 dB, the Tx UE 802 may use a Type 1 MCS (e.g., a lower level MCS), etc. At 818, the Tx UE 802 may transmit the PSCCH using the determined MCS.

In another aspect of the present disclosure, a network (e.g., the base station 102 or 180) may configure a Tx UE and/or an Rx UE with a constant/fixed power level (e.g., in dB) for transmitting the beacon RS, such as through an RRC signaling. Then, after the Rx UE receives a beacon RS from the Tx UE, the Rx UE may measure the path loss between the Tx UE and the Rx UE based on the beacon RS. Then, the Rx UE may set up an open loop power control for transmitting echo RS. For example, the Rx UE may set the echo RS transmission power (i.e., open loop power control for echo) to be:

Echo Tx Power=P0+Pass Loss Compensation.

P0 may be a constant target receiving power level for echo at receiver, and the value for P0 may be configured or indicated by the network (e.g., such as along with the echo power level). For example, if the network indicates to the Rx UE that the Tx UE has a target receiving power of 15 dB (e.g., meaning that the Tx UE desires to receive the echo RS with 15 dB) and the Rx UE determines that the path loss is 3 dB based on measuring the beacon RS from the Tx UE, the Rx UE may transmit the echo RS with 18 dB (P0+Pass Loss Compensation=15 dB+3 dB). Thus, the Tx UE may be able to receive the echo RS with the target receiving power (e.g., 15 dB) as the path loss has been compensated. One of the advantages of using an open loop power control for the echo RS is that the received power level at the Tx UE may be kept at constant or approximate to the power level P0 such that the channel estimation quality based on echo may be more accurate and reliable. This may enable to Tx UE to have a more robust precoder/or and RB selection.

Figure 9:
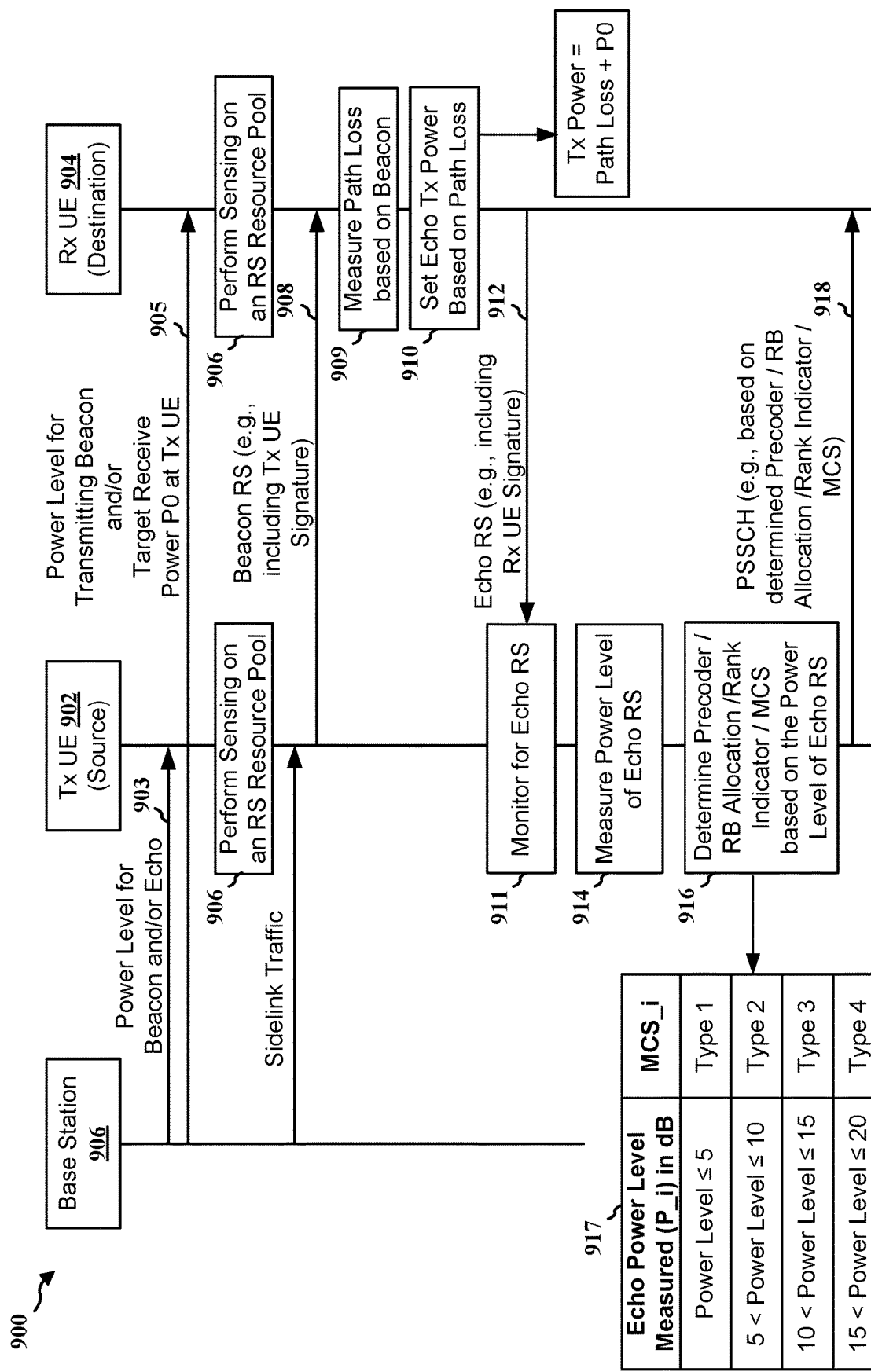
FIG. 9 is a communication flow illustrating a beacon-echo procedure according to aspects of the present disclosure.

FIG. 9 is a communication flow 900 between a Tx UE 902 (e.g., a first UE or a source UE), an Rx UE 904 (e.g., a second UE or a destination UE) and a base station 906 illustrating an example beacon-echo procedure with an open loop power control for an echo RS in accordance with various aspects of the present disclosure. At 903, the base station 906 may indicate to the Tx UE 902 at least one of a beacon power level (e.g., the power for the Tx UE 902 to transmit the beacon RS) and/or an echo power level (e.g., the power for the Rx UE 904 to transmit the beacon RS) for a beacon-echo procedure. The base station 906 may indicate the beacon power level and/or the echo power level to the Tx UE 902 through RRC signaling. Similarly, at 905, the base station 906 may also indicate to the Rx UE 904 a beacon power level for the beacon-echo procedure, such as through RRC signaling. In addition, the base station 906 may also indicate or configure a target received power (P0) for the echo RS that defines a power level in which the Tx UE 902 is to receive the echo RS (hereafter "target Rx power level for echo"). In one example, the beacon power level may be the same as the target Rx power level for echo. Thus, the Rx UE 904 may use the power level for transmitting the beacon RS as the target Rx power level for echo. The network may indicate or configure the target Rx power level for echo in an RRC signaling along with the echo power level and/or beacon power level, or the network may indicate or configure the target Rx power level for echo in a separate message or signaling.

At 906, before or after a sidelink traffic (e.g., a transmission data) arrives, the Tx UE 902 and/or the Rx UE 904 may perform sensing on an RS resource pool. At 908, when the Tx UE 902 has a traffic to transmit, the Tx UE 902 may select an available RS resource (e.g., RS resource 606) and transmit a beacon RS using the selected RS resource to the Rx UE 904. The beacon RS may include the Tx UE 902's signature sequence. The Tx UE 902 may also transmit the beacon RS based on the configured beacon power level. After the Tx UE 902 sends the beacon RS, at 911, the Tx UE 902 may monitor for an echo for the transmitted beacon RS from neighboring UEs. For example, after the Tx UE 902 sends the beacon RS, the Tx UE 902 may measure the subsequent RS resources until the Tx UE 902 detects an echo from a neighbor UE, which may be a designate node for the PSSCH transmission.

At 909, if the Rx UE 902 senses the beacon RS, the Rx UE 902 may measure the path loss between the Tx UE 902 and the Rx UE 904 based on the received beacon RS. For example, as the Rx UE 904 may be aware that the Tx UE 902 is transmitting the beacon RS with a fixed beacon power level of 20 dB, if the Rx UE 904 measures a received beacon RS to be 17 dB, then the Rx UE 904 may determine there is a 3 dB path loss. Thus, at 910, the Rx UE 904 may determine the transmission power for the subsequence echo RS based at least in part on the measured path loss and the target Rx power level for echo. For example, the Rx UE 904 may set the transmission power for the subsequent echo RS to be equal to the total of the path loss plus the target Rx power level for echo. Then, at 912, the Rx UE 904 may transmit an echo RS using the determined echo transmission power. The Rx UE 904 may use an available RS resource from the RS resource pool, which may be selected randomly and/or based on the sensing by the Rx UE 904. Similarly, the echo RS may include the Rx UE 904's signature sequence, and the Rx UE 904 may transmit the echo RS based on the configured echo power level.

At 914, if the Tx UE 902 detects the echo RS from the Rx UE 904 during the echo monitoring at 911, the Tx UE 902 may measure the power level of the received echo RS. At 916, based at least in part on the measured power level, the Tx UE 902 may determine one or more parameters for subsequent data transmission(s) to the Rx UE 904. For example, the Tx UE 902 may determine one or more parameters for a PSSCH transmission to the Rx UE 904, such as the precoder, RB allocation, rank indicator and/or MCS for transmitting the PSSCH, based at least in part on the echo RS from the Rx UE 904. At 918, the Tx UE 902 may transmit the PSCCH using the determined parameters. In one example, as described in connection with 816 of FIG. 8, the Tx UE 902 may determine the MCS based on a mapping 917 that defines the measured received echo power and the corresponding MCS. Thus, at 918, the Tx UE 902 may transmit the PSCCH using the determined MCS.

Figure 10:
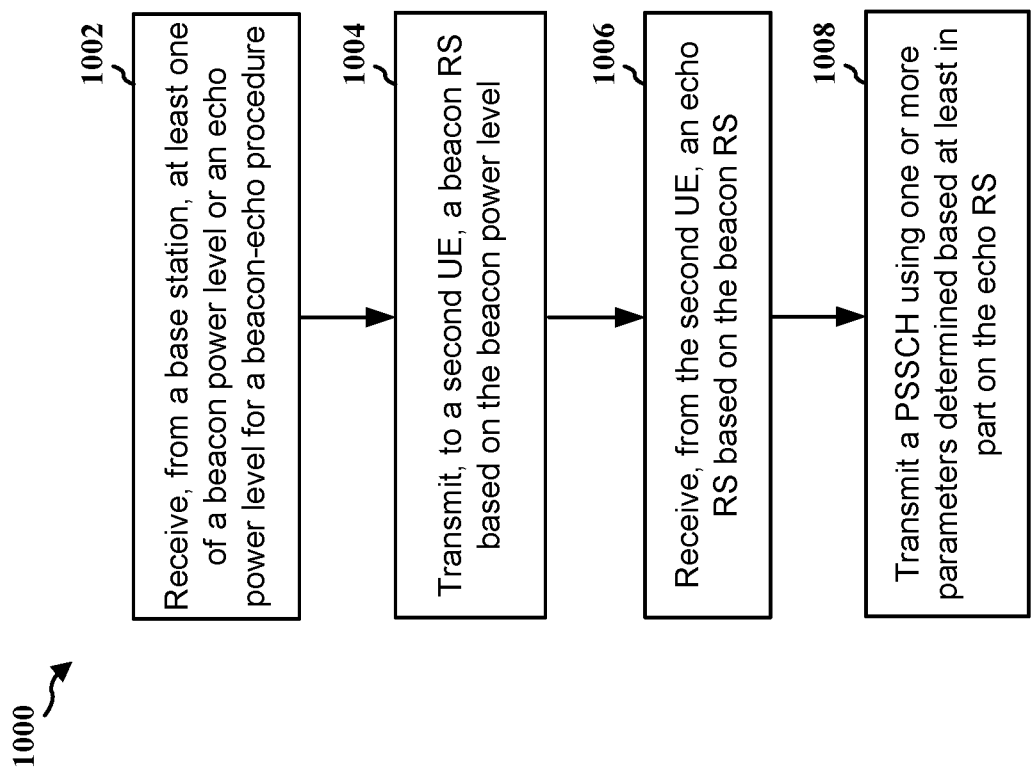
FIG. 10 is a flowchart of a method of wireless communication.

FIG. 10 is a flowchart 1000 of a method of wireless communication. The method may be performed by a UE or a component of a UE (e.g., the UE 104, 350, 502, 504, 506, 602, 702, 802, 902; the RSU 507; the apparatus 1102; a processing system, which may include the memory 360 and which may be the entire UE 350 or a component of the UE 350, such as the TX processor 368, the RX processor 356, and/or the controller/processor 359). The method may enable the UE to transmit beacon RS at a fixed power level and determine one or more parameters for data transmission based at least in part on a received echo RS.

At 1002, a first UE may receive, from a base station, at least one of a beacon power level or an echo power level for a beacon-echo procedure, such as described in connection with FIGS. 8 and 9. For example, at 803, the Tx UE 802 may receive at least one of a beacon power level and/or an echo power level for a beacon-echo procedure from the base station 801. The reception of the at least one of a beacon power level or an echo power level for a beacon-echo procedure may be performed by, e.g., the beacon echo power process component 1140 and/or the reception component 1130 of the apparatus 1102 in FIG. 11. The beacon power level and the echo power level may be equal, or they may be different. The at least one of the beacon power level or the echo power level for the beacon-echo procedure may be received from the base station via RRC signaling.

At 1004, the first UE may transmit, to a second UE, a beacon RS based on the beacon power level, such as described in connection with FIGS. 8 and 9. For example, at 808, the Tx UE 802 may select an available RS resource and transmit a beacon RS using the selected RS resource to the Rx UE 804, where the Tx UE 802 may transmit the beacon RS based on the configured beacon power level. The transmission of the beacon RS may be performed by, e.g., the beacon configuration component 1142 and/or the transmission component 1134 of the apparatus 1102 in FIG. 11. In some examples, prior to transmitting the beacon RS, the first UE may receive a configuration for an RS resource pool from the base station and determine a resource from the RS resource pool for transmitting the beacon RS. Thus, the first UE may transmit the beacon RS using the determined resource from the RS resource pool.

At 1006, the first UE may receive, from the second UE, an echo RS based on the beacon RS, such as described in connection with FIGS. 8 and 9. For example, at 812, the Tx UE 802 may receive an echo RS from the Rx UE 804. The beacon RS may include a signature sequence of the first UE and the echo RS may include a signature sequence of the second UE. The reception of the echo RS may be performed by, e.g., the echo monitoring component 1144 and/or the reception component 1130 of the apparatus 1102 in FIG. 11.

At 1008, the first UE may transmit a PSSCH using one or more parameters determined based at least in part on the echo RS, such as described in connection with FIGS. 8 and 9. For example, at 816, based at least in part on the measured power level, the Tx UE 802 may determine one or more parameters for subsequent data transmission(s) to the Rx UE 804, and at 818, the Tx UE 802 may transmit a PSSCH based on the determined one or more parameters. The transmission of the PSSCH may be performed by, e.g., the PSSCH component 1146 and/or the transmission component 1134 of the apparatus 1102 in FIG. 11. In one example, the one or more parameters may include at least one of a precoder, a RB allocation, a RI, or a MCS. In determining the one or more parameters for a PSSCH transmission, the first UE may perform a channel estimation for the PSSCH transmission based at least in part on the echo RS.

In one example, the PSSCH is transmitted with a higher MCS when a measured power for the echo RS is high, and the PSSCH is transmitted with a lower MCS when the measured power for the echo RS is low. A mapping between the measured power of the echo RS and the MCS may be defined for the first UE.

Figure 11:
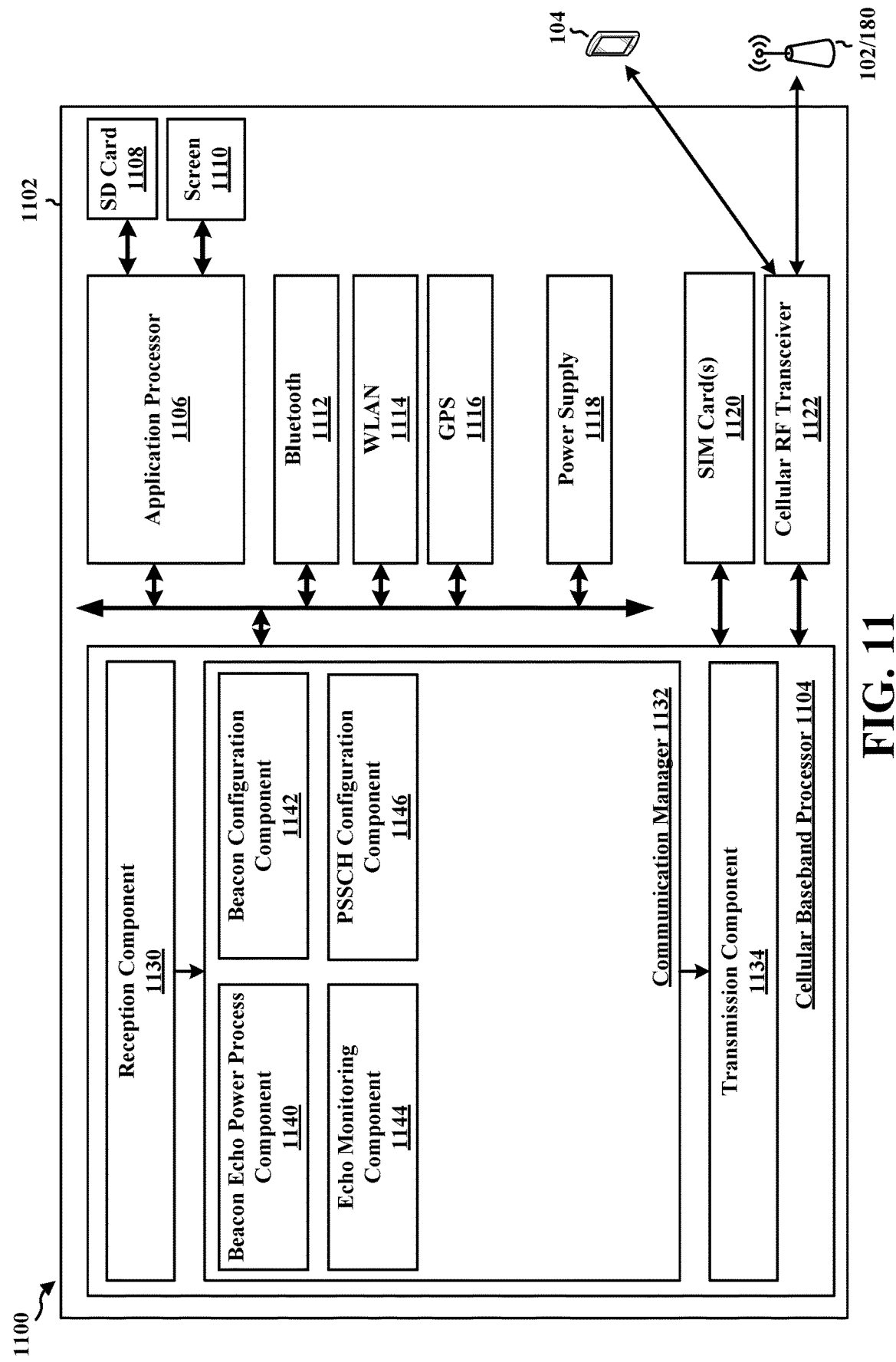
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire wireless device (e.g., see 350 of FIG. 3) and include the additional modules of the apparatus 1102.

The communication manager 1132 includes a beacon echo power process component 1140 that is configured to receive, from a base station, at least one of a beacon power level or an echo power level for a beacon-echo procedure, e.g., as described in connection with 1002 in FIG. 10. The communication manager 1132 further includes a beacon configuration component 1142 configured to transmit, to a second UE, a beacon RS based on the beacon power level, e.g., as described in connection with 1004 in FIG. 10. The communication manager 1132 further includes an echo monitoring component 1144 that is configured to receive, from the second UE, an echo RS based on the beacon RS, e.g., as described in connection with 1006 in FIG. 10. The communication manager 1132 further includes PSSCH configuration component 1146 that is configured to transmit a PSSCH using one or more parameters determined based at least in part on the echo RS, e.g., as described in connection with 1008 in FIG. 10.

The apparatus may include additional components that perform each of the blocks of the algorithm in the flowchart of FIG. 10. As such, each block in the flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving, from a base station, at least one of a beacon power level or an echo power level for a beacon-echo procedure (e.g., the beacon echo power process component 1140 and/or the reception component 1130). The apparatus 1102 includes means for transmitting, to a second UE, a beacon RS based on the beacon power level (e.g., the beacon configuration component 1142 and/or the transmission component 1134). The apparatus 1102 includes means for receiving, from the second UE, an echo RS based on the beacon RS (e.g., the echo monitoring component 1144 and/or the reception component 1130). The apparatus 1102 includes means for transmitting a PSSCH using one or more parameters determined based at least in part on the echo RS (e.g., the PSSCH component 1146 and/or the transmission component 1134). The beacon power level and the echo power level may be equal, or they may be different. The at least one of the beacon power level or the echo power level for the beacon-echo procedure may be received from the base station via RRC signaling. The beacon RS may include a signature sequence of the first UE and the echo RS may include a signature sequence of the second UE. The one or more parameters may include at least one of a precoder, a RB allocation, a RI, or a MCS. In determining the one or more parameters for a PSSCH transmission, the first UE may perform a channel estimation for the PSSCH transmission based at least in part on the echo RS.

In one configuration, the apparatus 1102 includes means for receiving a configuration for an RS resource pool from the base station. In such configuration, the apparatus 1102 includes means for determining a resource from the RS resource pool for transmitting the beacon RS. Thus the apparatus 1102 may transmit the beacon RS using the determined resource from the RS resource pool.

In one configuration, the PSSCH is transmitted with a higher MCS when a measured power for the echo RS is high, and the PSSCH is transmitted with a lower MCS when the measured power for the echo RS is low. In such configuration, a mapping between the measured power of the echo RS and the MCS may be defined for the apparatus 1102.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
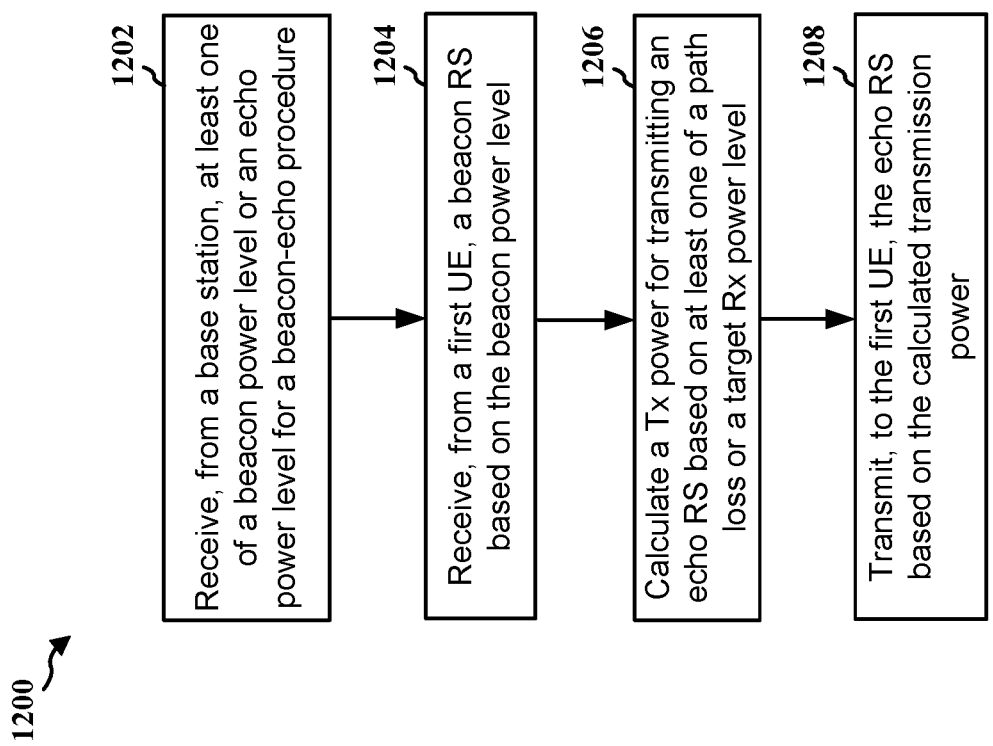
FIG. 12 is a flowchart of a method of wireless communication.

FIG. 12 is a flowchart 1200 of a method of wireless communication. The method may be performed by a UE or a component of a UE (e.g., the UE 104, 350, 502, 504, 506, 604, 704, 904; the RSU 507; the apparatus 1302; a processing system, which may include the memory 360 and which may be the entire UE 350 or a component of the UE 350, such as the TX processor 368, the RX processor 356, and/or the controller/processor 359). The method may enable the UE to measure the power level of the received beacon RS and determine an echo RS transmission power based on the measurement and a target receive power. Then, the UE may transmit the echo RS based on the determined echo RS transmission power.

At 1202, a second UE may receive, from a base station, a beacon power level for a beacon-echo procedure, such as described in connection with FIG. 9. For example, at 905, the Rx UE 904 may receive from the base station 906 the beacon power level for the beacon-echo procedure, such as through RRC signaling. The Rx UE 904 may also receive from the base station 906 a target received power (P0) for the echo RS that defines a power level in which the Tx UE 902 is to receive the echo RS. The reception of the beacon power level may be performed by, e.g., the beacon echo power process component 1340 and/or the reception component 1330 of the apparatus 1302 in FIG. 13.

At 1204, the second UE may receive, from a first UE, a beacon RS based on the beacon power level, such as described in connection with FIG. 9. For example, at 908, the Rx UE 904 may receive a beacon RS from the Tx UE 902, where the beacon RS may be transmitted by the Tx UE 902 based on the beacon power level configured by the base station 906. The reception of the beacon RS may be performed by, e.g., the beacon process component 1342 and/or the reception component 1330 of the apparatus 1302 in FIG. 13.

At 1206, the second UE may calculate a Tx power for transmitting an echo RS based on at least one of a path loss or a target Rx power level, such as described in connection with FIG. 9. For example, at 910, the Rx UE 904 may calculate the transmission power for the subsequence echo RS based at least in part on the measured path loss and the target Rx power level for echo. In calculating the Tx power for transmitting the echo RS, the second UE may measure the path loss based on the received beacon RS. The calculation of the Tx power for transmitting an echo RS may be performed by, e.g., the echo Tx power calculation component 1344 of the apparatus 1302 in FIG. 13.

At 1208, the second UE may transmit, to the first UE, the echo RS based on the calculated transmission power, such as described in connection with FIG. 9. For example, at 912, the Rx UE 904 may transmit an echo RS using the calculated echo transmission power. The transmission of the echo RS may be performed by, e.g., the echo configuration component 1346 and/or the transmission component 1334 of the apparatus 1302 in FIG. 13. In some examples, prior to transmitting the echo RS, the second UE may receive a configuration for an RS resource pool from the base station and select a resource from the RS resource pool for transmitting the echo RS. Thus, the second UE may transmit the echo RS using the selected resource from the RS resource pool. After transmitting the echo RS, the second UE may receive, from the first UE, a PSSCH transmission based at least in part on the transmitted echo RS. The beacon RS may include a signature sequence of the second UE and the echo RS may include a signature sequence of the first UE.

Figure 13:
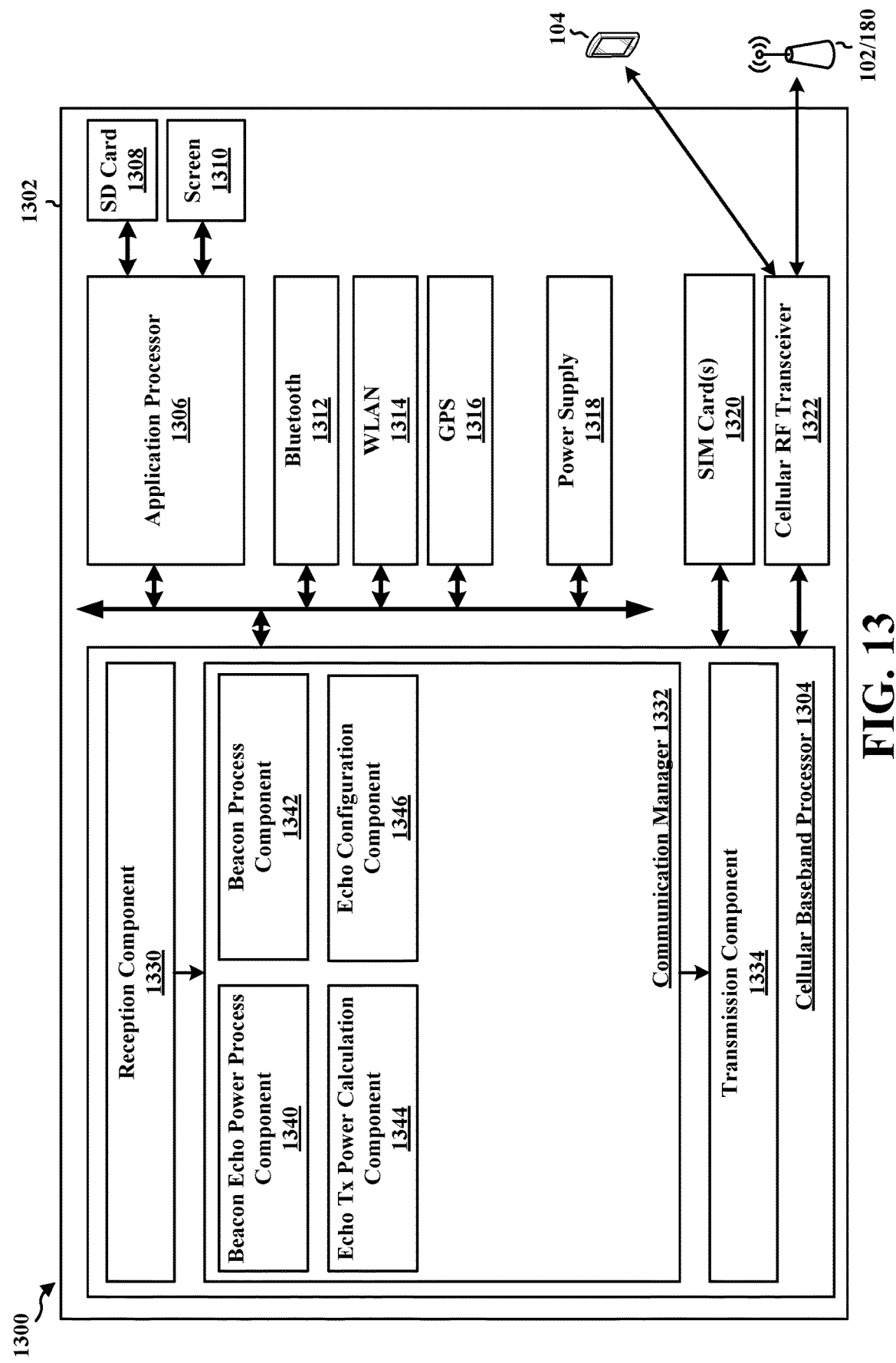
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire wireless device (e.g., see 350 of FIG. 3) and include the additional modules of the apparatus 1302.

The communication manager 1332 includes a beacon echo power process component 1340 that is configured to receive, from a base station, a beacon power level for a beacon-echo procedure, e.g., as described in connection with 1202 in FIG. 12. The communication manager 1332 further includes a beacon process component 1342 configured to receive, from a first UE, a beacon RS based on the beacon power level, e.g., as described in connection with 1204 in FIG. 12. The communication manager 1332 further includes an echo Tx power calculation component 1344 that is configured to calculate a Tx power for transmitting an echo RS based on at least one of a path loss or a target Rx power level, e.g., as described in connection with 1206 in FIG. 12. The communication manager 1332 further includes an echo configuration component 1346 that is configured to transmit, to the first UE, the echo RS based on the calculated transmission power, e.g., as described in connection with 1208 in FIG. 12.

The apparatus may include additional components that perform each of the blocks of the algorithm in the flowchart of FIG. 12. As such, each block in the flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving, from a base station, a beacon power level for a beacon-echo procedure (e.g., the beacon echo power process component 1340 and/or the reception component 1330). The apparatus 1302 includes means for receiving, from a first UE, a beacon RS based on the beacon power level (e.g., the beacon process component 1342 and/or the reception component 1330). The apparatus 1302 includes means for calculating a Tx power for transmitting an echo RS based on at least one of a path loss or a target Rx power level (e.g., the echo Tx power calculation component 1344). The apparatus 1302 includes means for transmitting, to the first UE, the echo RS based on the calculated transmission power (e.g., the echo configuration component 1346 and/or the transmission component 1334). The apparatus 1302 may also include means for measuring the path loss based on the beacon RS. The apparatus 1302 may also include means for receiving, from the first UE, a PSSCH transmission based at least in part on the transmitted echo RS. The apparatus 1302 may also include means for receiving the target Rx power level from the base station. The target Rx power level and/or the beacon power level for the beacon-echo procedure may be received from the base station via RRC signaling. The beacon RS may include a signature sequence of the second UE and the echo RS may include a signature sequence of the first UE. The beacon RS may be transmitted by the first UE based on the beacon power level.

In one configuration, the apparatus 1302 includes means for receiving a configuration for an RS resource pool from the base station. In such configuration, the apparatus 1302 includes means for selecting a resource from the RS resource pool for transmitting the echo RS. Thus the apparatus 1302 may transmit the echo RS using the selected resource from the RS resource pool.

The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
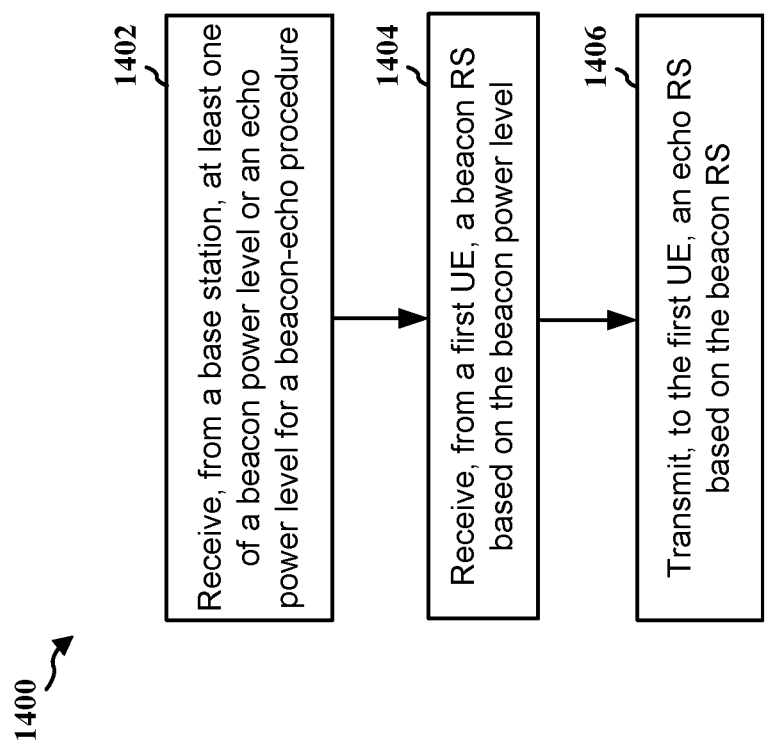
FIG. 14 is a flowchart of a method of wireless communication.

FIG. 14 is a flowchart 1400 of a method of wireless communication. The method may be performed by a UE or a component of a UE (e.g., the UE 104, 350, 502, 504, 506, 604, 704, 804; the RSU 507; the apparatus 1502; a processing system, which may include the memory 360 and which may be the entire UE 350 or a component of the UE 350, such as the TX processor 368, the RX processor 356, and/or the controller/processor 359). The method may enable the UE to transmit echo RS at a constant power level.

At 1402, a second UE may receive, from a base station, at least one of a beacon power level or an echo power level for a beacon-echo procedure, such as described in connection with FIG. 8. For example, at 805, the Rx UE 804 may receive from the base station 801 at least one of the beacon power level and/or the echo power level for the beacon-echo procedure, such as through RRC signaling. The reception of the at least one of a beacon power level or an echo power level for a beacon-echo procedure may be performed by, e.g., the beacon echo power process component 1540 and/or the reception component 1530 of the apparatus 1502 in FIG. 15. In one example, the beacon power level and the echo power level may be equal. In another example, the beacon power level and the echo power level may be different.

At 1404, the second UE may receive, from a first UE, a beacon RS based on the beacon power level, such as described in connection with FIG. 8. For example, at 808, the Rx UE 804 may receive a beacon RS from the Tx UE 802, where the beacon RS may be transmitted by the Tx UE 802 based on the beacon power level configured by the base station 801. The reception of the beacon RS may be performed by, e.g., the beacon process component 1542 and/or the reception component 1530 of the apparatus 1502 in FIG. 15.

At 1406, the second UE may transmit, to the first UE, an echo RS based on the echo power level, such as described in connection with FIG. 8. For example, at 812, the Rx UE 804 may transmit an echo RS based on the echo power level. The transmission of the echo RS may be performed by, e.g., the echo configuration component 1544 and/or the transmission component 1534 of the apparatus 1502 in FIG. 15. In some examples, prior to transmitting the echo RS, the second UE may receive a configuration for an RS resource pool from the base station and select a resource from the RS resource pool for transmitting the echo RS. Thus, the second UE may transmit the echo RS using the selected resource from the RS resource pool. After transmitting the echo RS, the second UE may receive, from the first UE, a PSSCH transmission based at least in part on the transmitted echo RS. The beacon RS may include a signature sequence of the second UE and the echo RS may include a signature sequence of the first UE.

Figure 15:
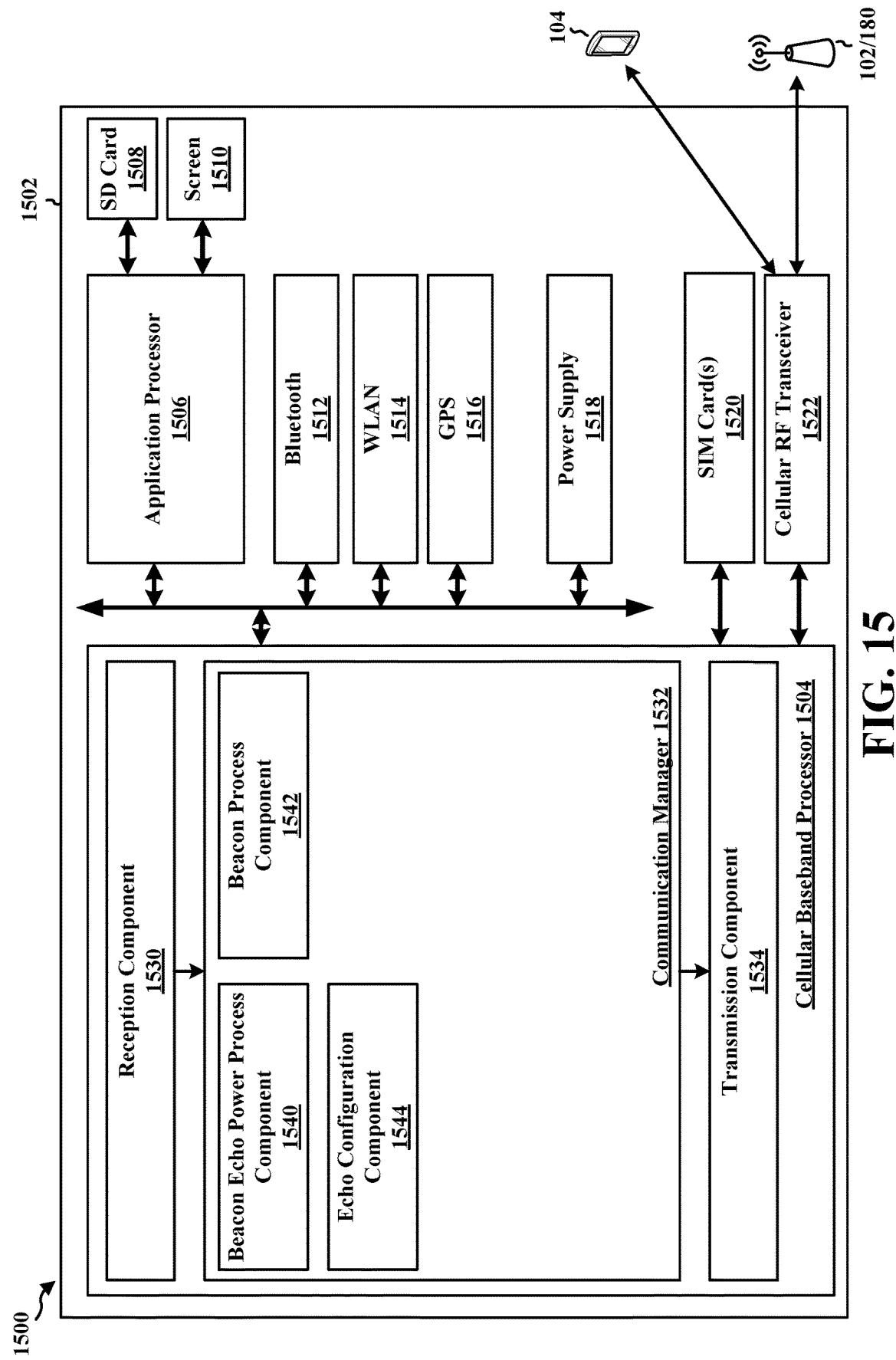
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire wireless device (e.g., see 350 of FIG. 3) and include the additional modules of the apparatus 1502.

The communication manager 1532 includes a beacon echo power process component 1540 that is configured to receive, from a base station, at least one of a beacon power level or an echo power level for a beacon-echo procedure, e.g., as described in connection with 1402 in FIG. 14. The communication manager 1532 further includes a beacon process component 1542 configured to receive, from a first UE, a beacon RS based on the beacon power level, e.g., as described in connection with 1404 in FIG. 14. The communication manager 1532 further includes an echo transmission component 1544 that is configured to transmit, to the first UE, an echo RS based on the echo power level, e.g., as described in connection with 1406 in FIG. 14.

The apparatus may include additional components that perform each of the blocks of the algorithm in the flowchart of FIG. 14. As such, each block in the flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for receiving, from a base station, at least one of a beacon power level or an echo power level for a beacon-echo procedure (e.g., the beacon echo power process component 1540 and/or the reception component 1530). The apparatus 1502 includes means for receiving, from a first UE, a beacon RS based on the beacon power level (e.g., the beacon process component 1542 and/or the reception component 1530). The apparatus 1502 includes means for transmitting, to the first UE, the echo RS based on the echo power level (e.g., the echo configuration component 1544 and/or the transmission component 1534). The apparatus 1502 may also include means for receiving, from the first UE, a PSSCH transmission based at least in part on the transmitted echo RS. The at least one of the beacon power level or the echo power level for the beacon-echo procedure may be received from the base station via RRC signaling. The beacon RS may include a signature sequence of the first UE and the echo RS may include a signature sequence of the first UE. The beacon power level and the echo power level may be equal, or they may be different. The beacon RS may be transmitted by the first UE based on the beacon power level.

In one configuration, the apparatus 1502 includes means for receiving a configuration for an RS resource pool from the base station. In such configuration, the apparatus 1502 includes means for selecting a resource from the RS resource pool for transmitting the echo RS. Thus the apparatus 1502 may transmit the echo RS using the selected resource from the RS resource pool.

The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive, from a base station, at least one of a beacon power level or an echo power level for a beacon-echo procedure; transmit, to a second UE, a beacon RS based on the beacon power level; receive, from the second UE, an echo RS based on the beacon RS; and transmit a PSSCH using one or more parameters determined based at least in part on the echo RS.

Aspect 2 is the apparatus of aspect 1, where the at least one processor is further configured to: receive a configuration for an RS resource pool from the base station; and select a resource from the RS resource pool for transmitting the beacon RS; where the beacon RS is transmitted using the selected resource from the RS resource pool.

Aspect 3 is the apparatus of any of aspects 1 and 2, where the one or more parameters includes at least one of a precoder, an RB allocation, an RI, or an MCS.

Aspect 4 is the apparatus of any of aspects 1 to 3, where the PSSCH is transmitted with a higher MCS when a measured power for the echo RS is high, and the PSSCH is transmitted with a lower MCS when the measured power for the echo RS is low.

Aspect 5 is the apparatus of any of aspects 1 to 4, where a mapping between the measured power of the echo RS and the MCS is defined for the first UE.

Aspect 6 is the apparatus of any of aspects 1 to 5, where the beacon RS includes a signature sequence of the first UE and the echo RS includes a signature sequence of the second UE.

Aspect 7 is the apparatus of any of aspects 1 to 6, where the beacon power level and the echo power level are equal.

Aspect 8 is the apparatus of any of aspects 1 to 7, where the beacon power level and the echo power level are different.

Aspect 9 is the apparatus of any of aspects 1 to 8, where the at least one of the beacon power level or the echo power level for the beacon-echo procedure is received from the base station via RRC signaling.

Aspect 10 is the apparatus of any of aspects 1 to 9, where the at least one processor is further configured to: perform a channel estimation for transmitting the PSSCH based at least in part on the echo RS.

Aspect 11 is a method of wireless communication for implementing any of aspects 1 to 10.

Aspect 12 is an apparatus for wireless communication including means for implementing any of aspects 1 to 10.

Aspect 13 is a computer-readable medium storing computer executable code, where the code when executed by a processor causes the processor to implement any of aspects 1 to 10.

Aspect 14 is an apparatus for wireless communication including at least one processor coupled to a memory and configured to receive, from a base station, a beacon power level for a beacon-echo procedure; receive, from a first UE, a beacon RS based on the beacon power level; calculate a Tx power for transmitting an echo RS based on at least one of a path loss or a target Rx power level; and transmit, to the first UE, the echo RS based on the calculated transmission power.

Aspect 15 is the apparatus of aspect 14, where the at least one processor is further configured to: measure the path loss based on the beacon RS.

Aspect 16 is the apparatus of any of aspects 14 and 15, where the at least one processor is further configured to: receive, from the first UE, a PSSCH transmission based at least in part on the transmitted echo RS.

Aspect 17 is the apparatus of any of aspects 14 to 16, where the at least one processor is further configured to: receive a configuration for an RS resource pool from the base station; and select a resource from the RS resource pool for transmitting the echo RS; where the echo RS is transmitted using the selected resource from the RS resource pool.

Aspect 18 is the apparatus of any of aspects 14 to 17, where the at least one processor is further configured to: receive the target Rx power level from the base station.

Aspect 19 is a method of wireless communication for implementing any of aspects 14 to 18.

Aspect 20 is an apparatus for wireless communication including means for implementing any of aspects 14 to 18.

Aspect 21 is a computer-readable medium storing computer executable code, where the code when executed by a processor causes the processor to implement any of aspects 14 to 18.

Aspect 22 is an apparatus for wireless communication including at least one processor coupled to a memory and configured to receive, from a base station, at least one of a beacon power level or an echo power level for a beacon-echo procedure; receive, from a first UE, a beacon RS based on the beacon power level; and transmit, to the first UE, an echo RS based on the echo power level.

Aspect 23 is the apparatus of aspect 22, where the at least one processor is further configured to: receive, from the first UE, a PSSCH transmission based at least in part on the transmitted echo RS.

Aspect 24 is the apparatus of any of aspects 22 and 23, where the at least one processor is further configured to: receive a configuration for an RS resource pool from the base station; and select a resource from the RS resource pool for transmitting the echo RS; where the echo RS is transmitted using the selected resource from the RS resource pool.

Aspect 25 is the apparatus of any of aspects 22 to 24, where the beacon power level and the echo power level are equal.

Aspect 26 is the apparatus of any of aspects 22 to 25, where the beacon power level and the echo power level are different.

Aspect 27 is a method of wireless communication for implementing any of aspects 22 to 26.

Aspect 28 is an apparatus for wireless communication including means for implementing any of aspects 22 to 26.

Aspect 29 is a computer-readable medium storing computer executable code, where the code when executed by a processor causes the processor to implement any of aspects 22 to 26.

What is claimed is:

1. An apparatus for wireless communication at a first user equipment (UE), comprising:
   a memory; and
   at least one processor coupled to the memory and configured to:
      receive, from a base station, at least one of a beacon power level or an echo power level for a beacon-echo procedure;
      transmit, to a second UE, a beacon reference signal (RS) based on the beacon power level;
      receive, from the second UE, an echo RS based on the beacon RS; and
      transmit a physical sidelink shared channel (PSSCH) using at least one of a precoder, a resource block (RB) allocation, a rank indicator (RI), or a modulation and coding scheme (MCS) determined based at least in part on a measured power for the echo RS.

2. The apparatus of claim 1, wherein the at least one processor is further configured to:
   receive a configuration for an RS resource pool from the base station; and
   select a resource from the RS resource pool for transmitting the beacon RS;
   wherein the beacon RS is transmitted using the selected resource from the RS resource pool.

3. The apparatus of claim 1, wherein the at least one processor is further configured to: determine the at least one of the precoder, the RB allocation, the RI, or the MCS based at least in part on the measured power for the echo RS.

4. The apparatus of claim 1, wherein to transmit the PSSCH, the at least one processor is configured to: transmit the PSSCH with a higher MCS when the measured power for the echo RS is high, and transmit the PSSCH with a lower MCS when the measured power for the echo RS is low.

5. The apparatus of claim 1, wherein a mapping between the measured power of the echo RS and the MCS is defined for the first UE.

6. The apparatus of claim 1, wherein the beacon RS comprises a signature sequence of the first UE and the echo RS comprises a signature sequence of the second UE.

7. The apparatus of claim 1, wherein the beacon power level and the echo power level are equal.

8. The apparatus of claim 1, wherein the beacon power level and the echo power level are different.

9. The apparatus of claim 1, wherein to receive the at least one of the beacon power level or the echo power level for the beacon-echo procedure, the at least one processor is configured to receive the at least one of the beacon power level or the echo power level for the beacon-echo procedure from the base station via radio resource control (RRC) signaling.

10. The apparatus of claim 1, wherein the at least one processor is further configured to:
    perform a channel estimation for transmitting the PSSCH based at least in part on the echo RS.

11. A method of wireless communication at a first user equipment (UE), comprising:
    receiving, from a base station, at least one of a beacon power level or an echo power level for a beacon-echo procedure;
    transmitting, to a second UE, a beacon reference signal (RS) based on the beacon power level;
    receiving, from the second UE, an echo RS based on the beacon RS; and
    transmitting a physical sidelink shared channel (PSSCH) using at least one of a precoder, a resource block (RB) allocation, a rank indicator (RI), or a modulation and coding scheme (MCS) determined based at least in part on a measured power for the echo RS.

12. The method of claim 11, further comprising:
    receiving a configuration for an RS resource pool from the base station; and
    selecting a resource from the RS resource pool for transmitting the beacon RS;
    wherein the beacon RS is transmitted using the selected resource from the RS resource pool.

13. The method of claim 11, further comprising: determining the at least one of the precoder, the RB allocation, the RI, or the MCS based at least in part on the measured power for the echo RS.

14. The method of claim 11, wherein the PSSCH is transmitted with a higher MCS when the measured power for the echo RS is high, and the PSSCH is transmitted with a lower MCS when the measured power for the echo RS is low.

15. The method of claim 11, wherein a mapping between the measured power of the echo RS and the MCS is defined for the first UE.

16. The method of claim 11, wherein the beacon RS comprises a signature sequence of the first UE and the echo RS comprises a signature sequence of the second UE.

17. The method of claim 11, wherein the beacon power level and the echo power level are equal.

18. The method of claim 11, wherein the beacon power level and the echo power level are different.

19. The method of claim 11, wherein the at least one of the beacon power level or the echo power level for the beacon-echo procedure is received from the base station via radio resource control (RRC) signaling.

20. The method of claim 11, further comprising:
performing a channel estimation for transmitting the PSSCH based at least in part on the echo RS.

21. An apparatus for wireless communication at a second user equipment (UE), comprising:
a memory; and
at least one processor coupled to the memory and configured to:
receive, from a base station, a beacon power level for a beacon-echo procedure;
receive, from a first UE, a beacon reference signal (RS) based on the beacon power level;
calculate a transmission (Tx) power for transmitting an echo RS based on at least one of a path loss or a target reception (Rx) power level;
transmit, to the first UE, the echo RS based on the calculated transmission power; and
receive, from the first UE, a physical sidelink shared channel (PSSCH) transmission with at least one of a precoder, a resource block (RB) allocation, a rank indicator (RI), or a modulation and coding scheme (MCS) determined based at least in part on the calculated transmission power of the echo RS.

22. The apparatus of claim 21, wherein the at least one processor is further configured to:
measure the path loss based on the beacon RS.

23. The apparatus of claim 21, wherein to receive the PSSCH, the at least one processor is configured to: receive the PSSCH with a higher MCS when a measured power for the echo RS is high, and receive the PSSCH with a lower MCS when the measured power for the echo RS is low.

24. The apparatus of claim 21, wherein the at least one processor is further configured to:
receive a configuration for an RS resource pool from the base station; and
select a resource from the RS resource pool for transmitting the echo RS;
wherein the echo RS is transmitted using the selected resource from the RS resource pool.

25. The apparatus of claim 21, wherein the at least one processor is further configured to:
receive the target Rx power level from the base station.

26. An apparatus for wireless communication of a second user equipment (UE), comprising:
a memory; and
at least one processor coupled to the memory and configured to:
receive, from a base station, at least one of a beacon power level or an echo power level for a beacon-echo procedure;
receive, from a first UE, a beacon reference signal (RS) based on the beacon power level;
transmit, to the first UE, an echo RS based on the echo power level; and
receive, from the first UE, a physical sidelink shared channel (PSSCH) transmission with at least one of a precoder, a resource block (RB) allocation, a rank indicator (RI), or a modulation and coding scheme (MCS) determined based at least in part on the echo power level of the echo RS.

27. The apparatus of claim 26, wherein to receive the PSSCH, the at least one processor is configured to: receive the PSSCH with a higher MCS when a measured power for the echo RS is high, and receive the PSSCH with a lower MCS when the measured power for the echo RS is low.

28. The apparatus of claim 26, wherein the at least one processor is further configured to:
receive a configuration for an RS resource pool from the base station; and
select a resource from the RS resource pool for transmitting the echo RS;
wherein the echo RS is transmitted using the selected resource from the RS resource pool.

29. The apparatus of claim 26, wherein the beacon power level and the echo power level are equal.

30. The apparatus of claim 26, wherein the beacon power level and the echo power level are different.

* * * * *